US008688256B2

(12) United States Patent
Cheng et al.

(10) Patent No.: US 8,688,256 B2
(45) Date of Patent: Apr. 1, 2014

(54) ADVANCED PROCESS CONTROL SYSTEM AND METHOD UTILIZING VIRTUAL METROLOGY WITH RELIANCE INDEX

(75) Inventors: Fan-Tien Cheng, Tainan (TW); Chi-An Kao, Tainan (TW); Wei-Ming Wu, Tainan (TW)

(73) Assignees: National Cheng Kung University, Tainan (TW); Foresight Technology Company, Ltd., Tainan (TW)

( * ) Notice: Subject to any disclaimer, the term of this patent is extended or adjusted under 35 U.S.C. 154(b) by 361 days.

(21) Appl. No.: 13/193,607

(22) Filed: Jul. 29, 2011

(65) Prior Publication Data

US 2012/0029662 A1   Feb. 2, 2012

Related U.S. Application Data

(60) Provisional application No. 61/369,761, filed on Aug. 2, 2010.

(51) Int. Cl.
*G05B 13/02* (2006.01)
*G06F 19/00* (2011.01)

(52) U.S. Cl.
USPC ............. 700/121; 700/28; 700/29; 700/31; 700/32; 700/108; 700/110

(58) Field of Classification Search
USPC ............. 700/28–31, 108, 110, 121
See application file for complete search history.

(56) References Cited

U.S. PATENT DOCUMENTS

| 7,359,759 B2 * | 4/2008 | Cheng et al. | 700/121 |
| 7,363,099 B2 * | 4/2008 | Smith et al. | 700/121 |
| 7,593,912 B2 * | 9/2009 | Cheng et al. | 706/62 |
| 7,603,328 B2 * | 10/2009 | Cheng et al. | 706/15 |
| 7,974,723 B2 * | 7/2011 | Moyne et al. | 700/101 |
| 8,014,991 B2 * | 9/2011 | Mitrovic et al. | 703/13 |
| 8,036,869 B2 * | 10/2011 | Strang et al. | 703/13 |
| 8,108,060 B2 * | 1/2012 | Tsen et al. | 700/108 |

(Continued)

FOREIGN PATENT DOCUMENTS

| JP | 2007510287 A | 4/2007 |
| JP | 2009282960 A | 12/2009 |

OTHER PUBLICATIONS

An Approach for Factory-Wide Control Utilizing Virtual Metrology.
On the Quality of Virtual Metrology Data for Use in the Feedback Process Control.
Performance Analysis of EWMA Controllers Subject to Metrology Delay.

(Continued)

*Primary Examiner* — Ronald Hartman, Jr.
(74) *Attorney, Agent, or Firm* — CKC & Partners Co., Ltd.

(57) ABSTRACT

An advanced process control (APC) system, an APC method, and a computer program product, which, when executed, performs an APC method are provided for incorporating virtual metrology (VM) into APC. The present inventions uses a reliance index (RI) and a global similarity index (GSI) to adjust at least one controller gain of a run-to-run (R2R) controller when the VM value of a workpiece is adopted to replace the actual measurement value of the workpiece. The RI is used for gauging the reliability of the VM value, and the GSI is used for assessing the degree of similarity between the set of process data for generating the VM value and all the sets of historical process data used for building the conjecturing model.

15 Claims, 19 Drawing Sheets

(56) References Cited

U.S. PATENT DOCUMENTS

| | | | | |
|---|---|---|---|---|
| 8,392,009 B2 * | 3/2013 | Fei et al. | | 700/108 |
| 8,433,434 B2 * | 4/2013 | Wang et al. | | 700/110 |
| 8,437,870 B2 * | 5/2013 | Tsai et al. | | 700/110 |
| 2006/0129257 A1 * | 6/2006 | Chen et al. | | 700/96 |
| 2009/0292386 A1 | 11/2009 | Cheng et al. | | |
| 2011/0202160 A1 * | 8/2011 | Moyne | | 700/104 |

OTHER PUBLICATIONS

Virtual metrology and feedback control for semiconductor manufacturing processes using recursive partial least squares.

* cited by examiner

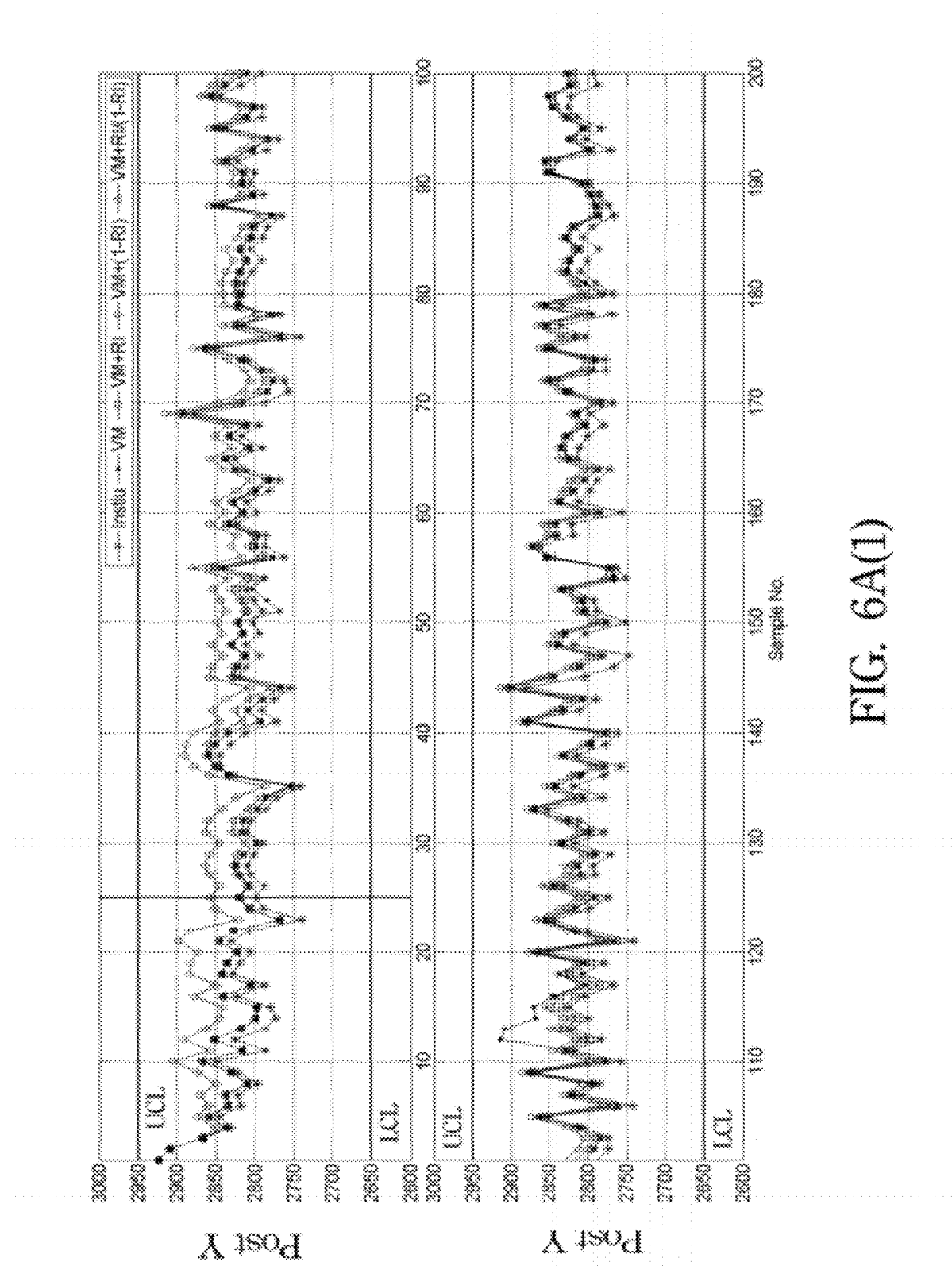
FIG. 6A(1)

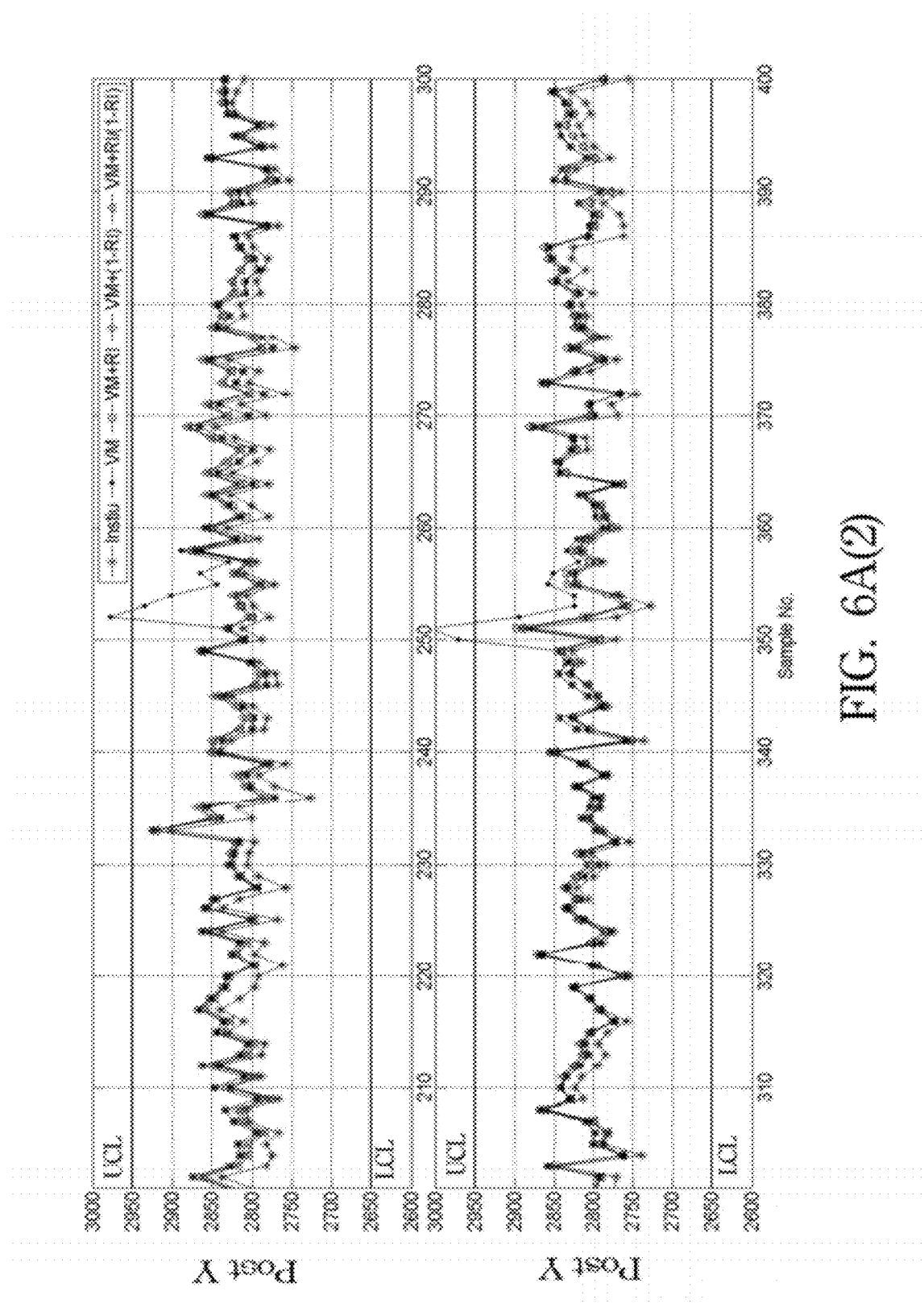
FIG. 6A(2)

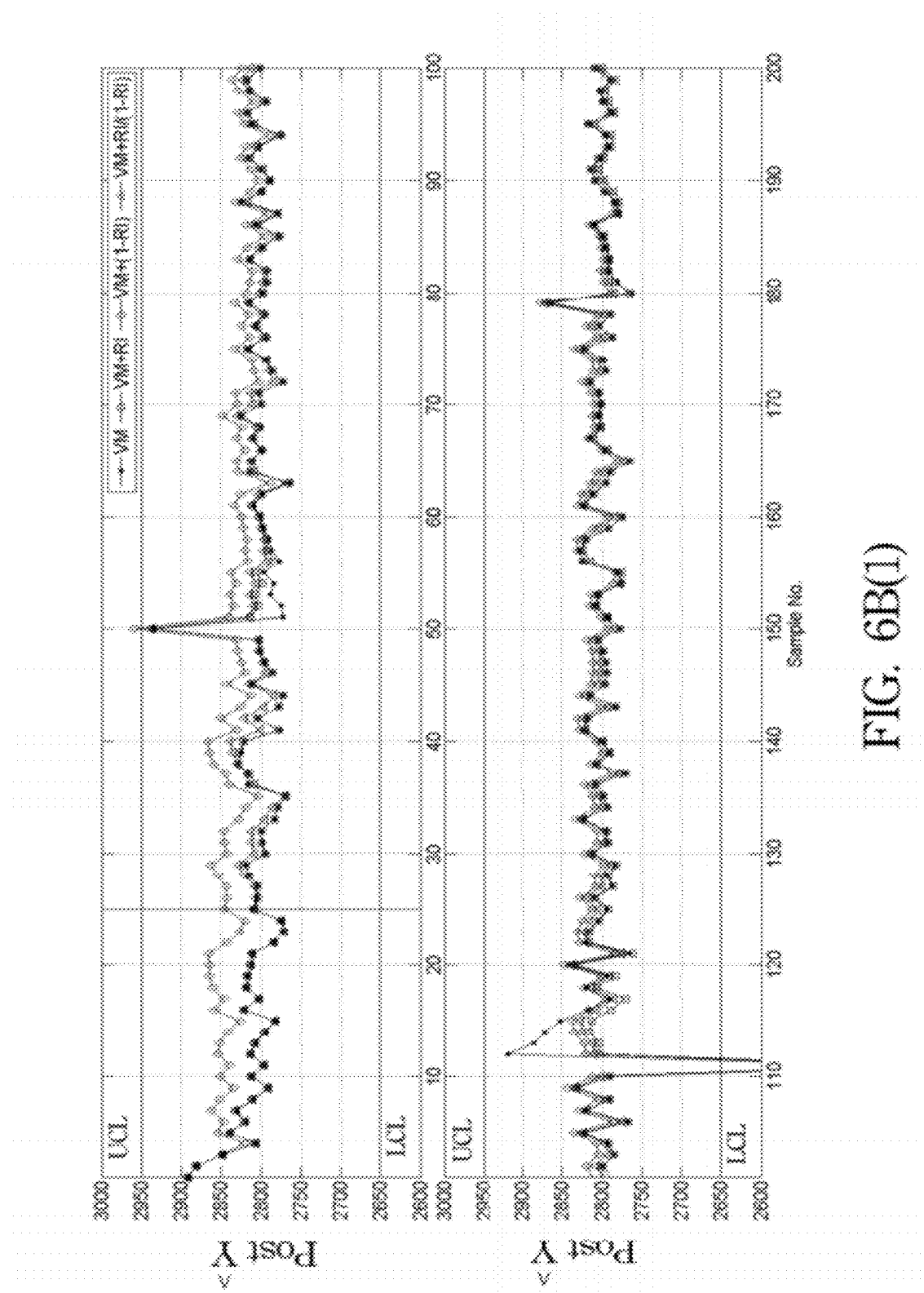
FIG. 6B(1)

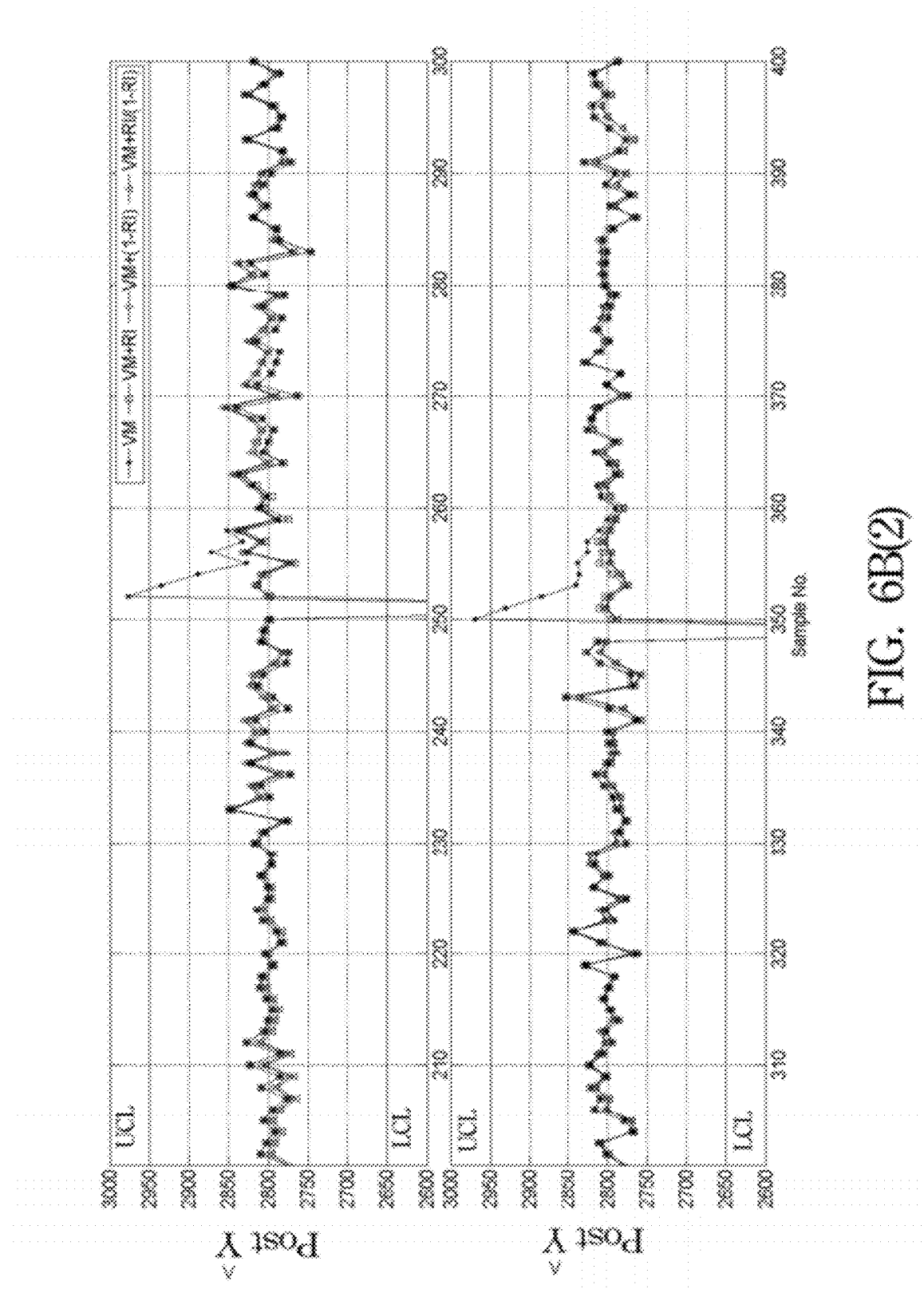
FIG. 6B(2)

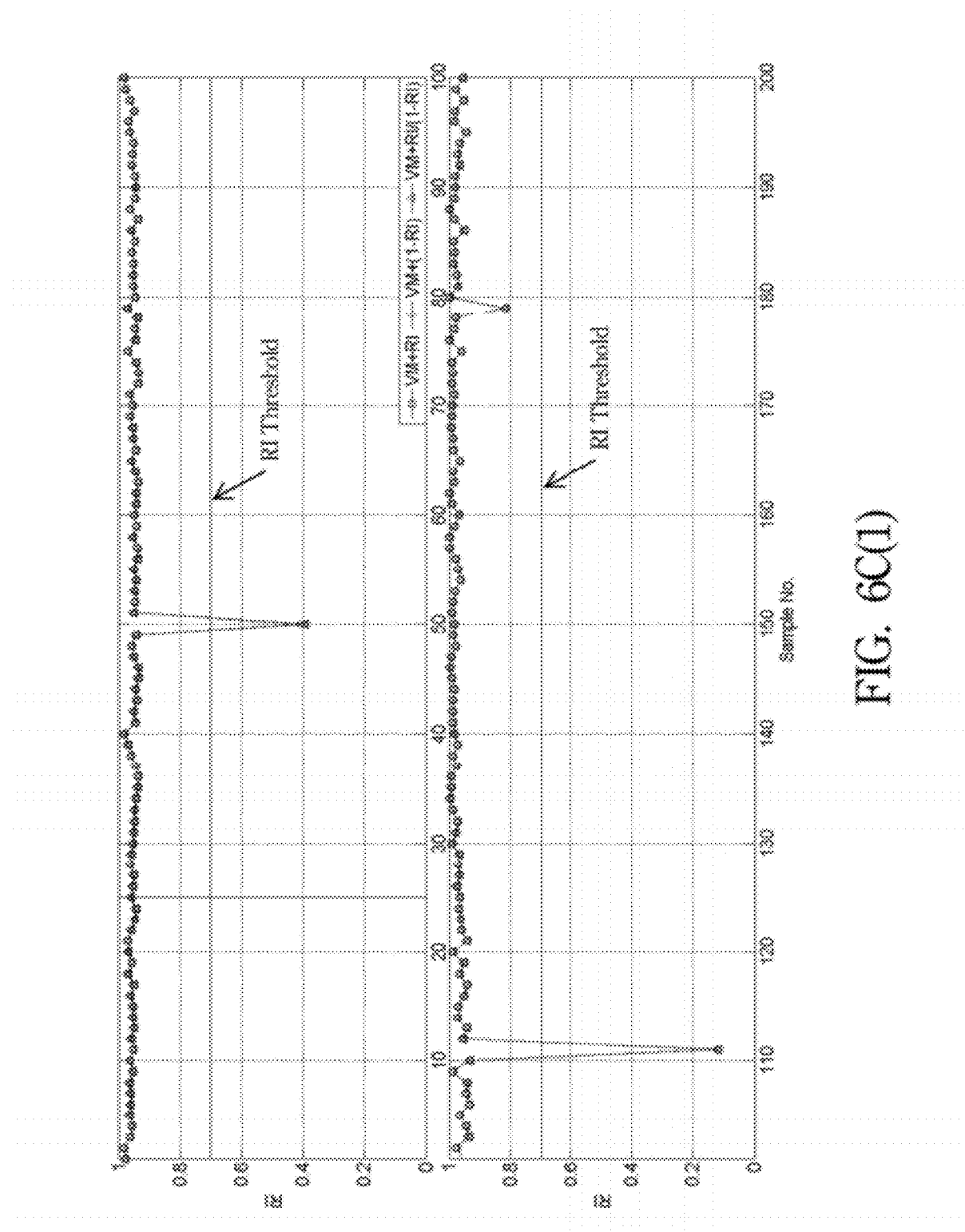
FIG. 6C(1)

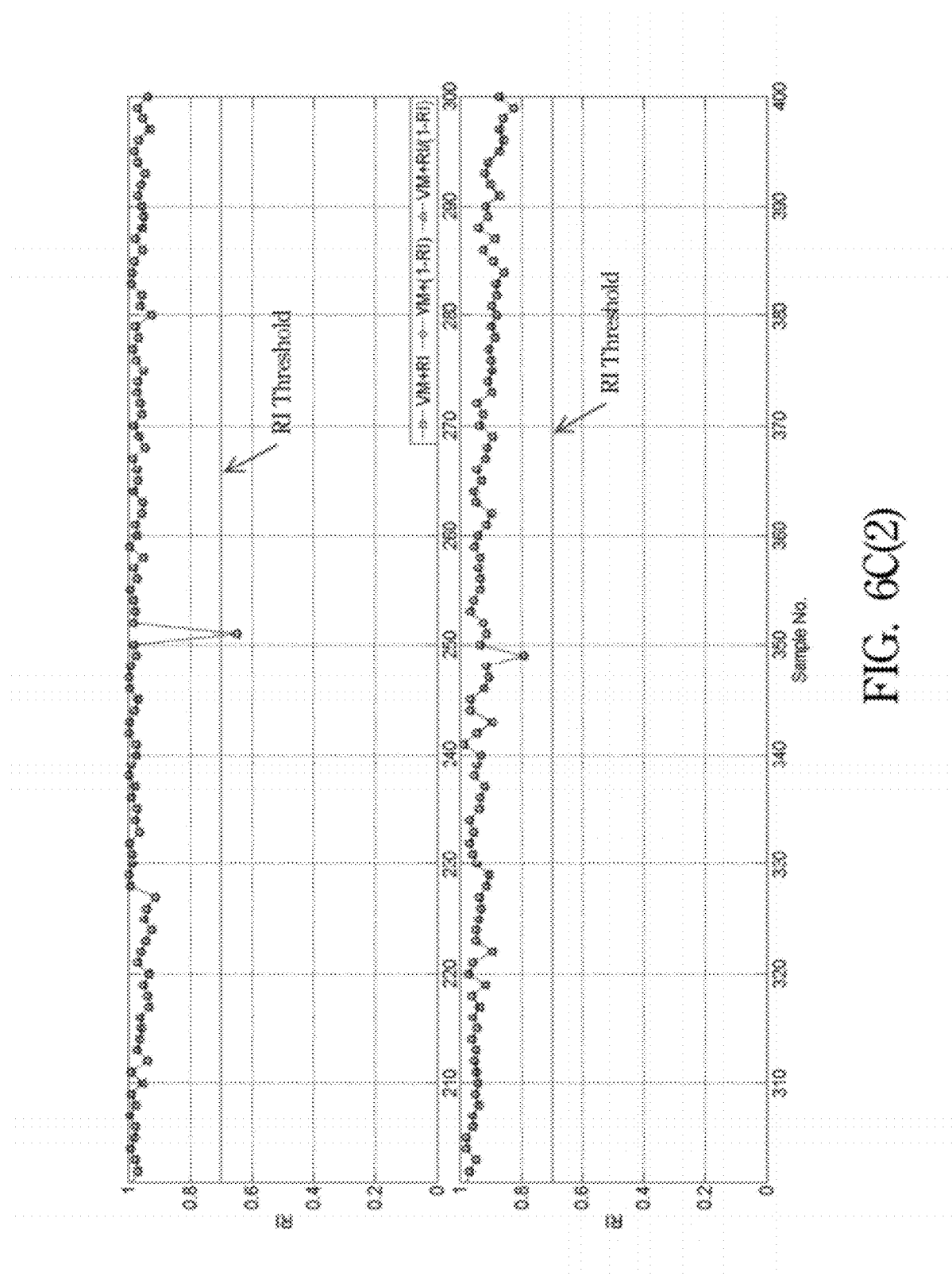
FIG. 6C(2)

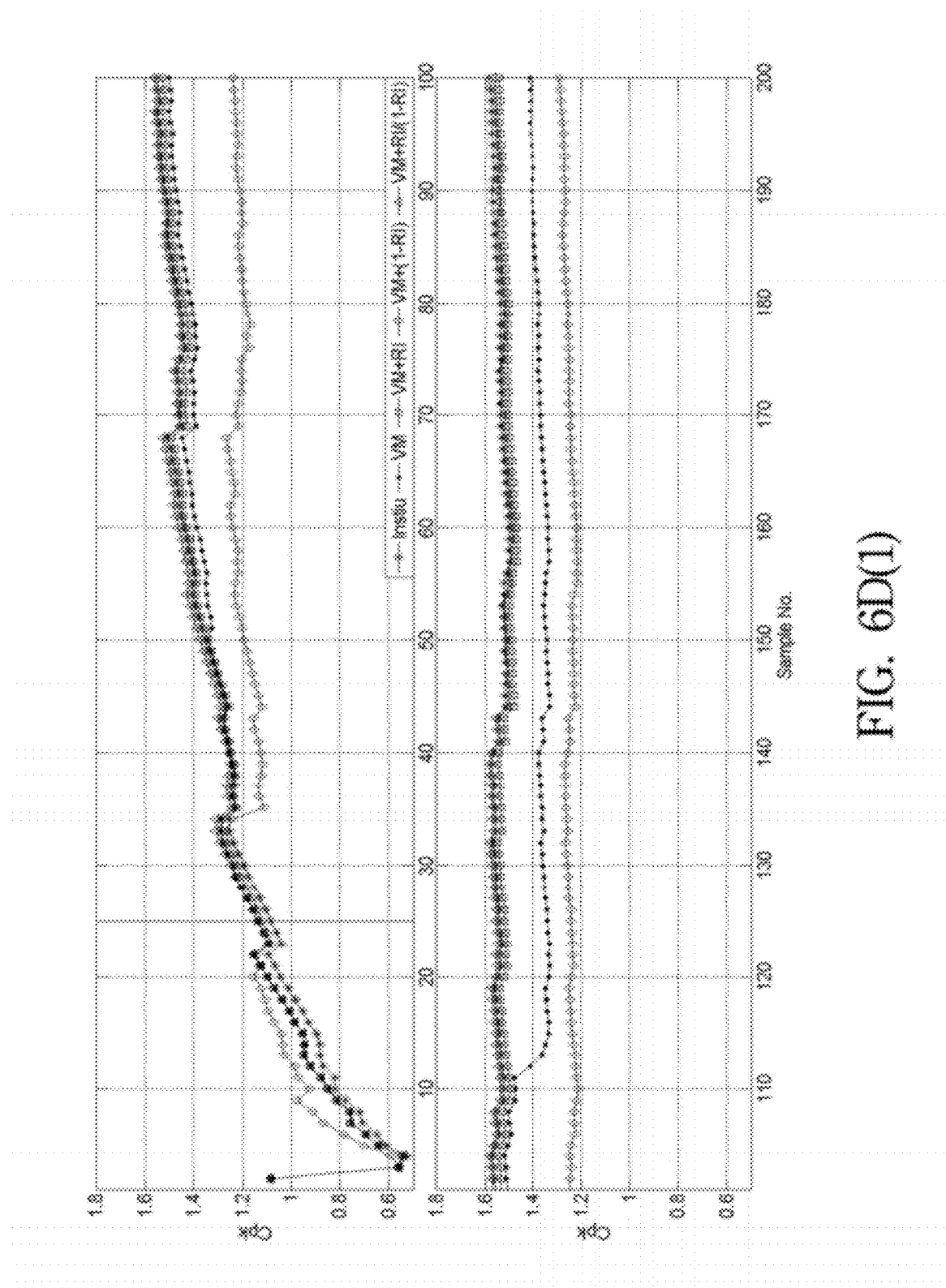
FIG. 6D(1)

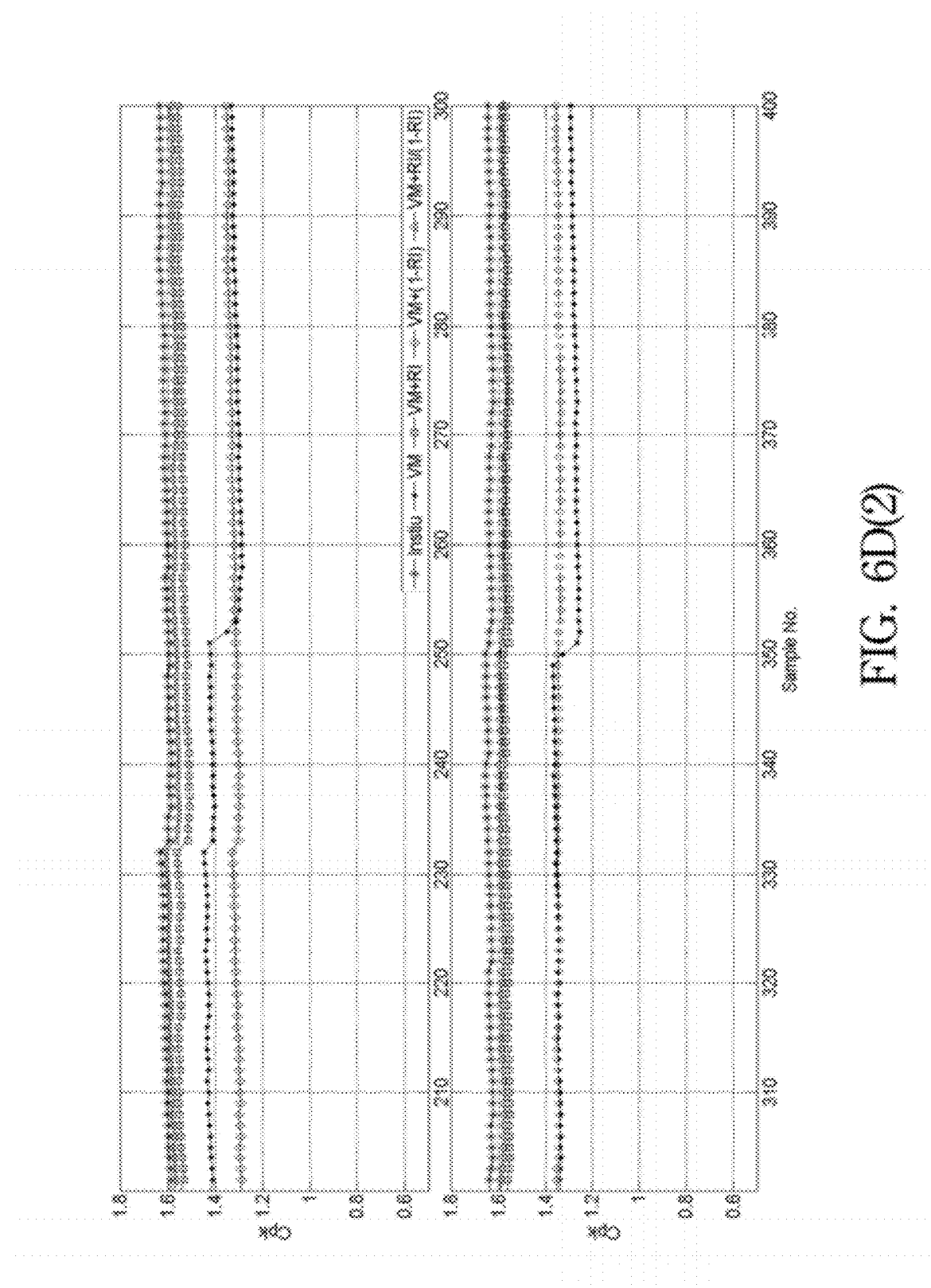
FIG. 6D(2)

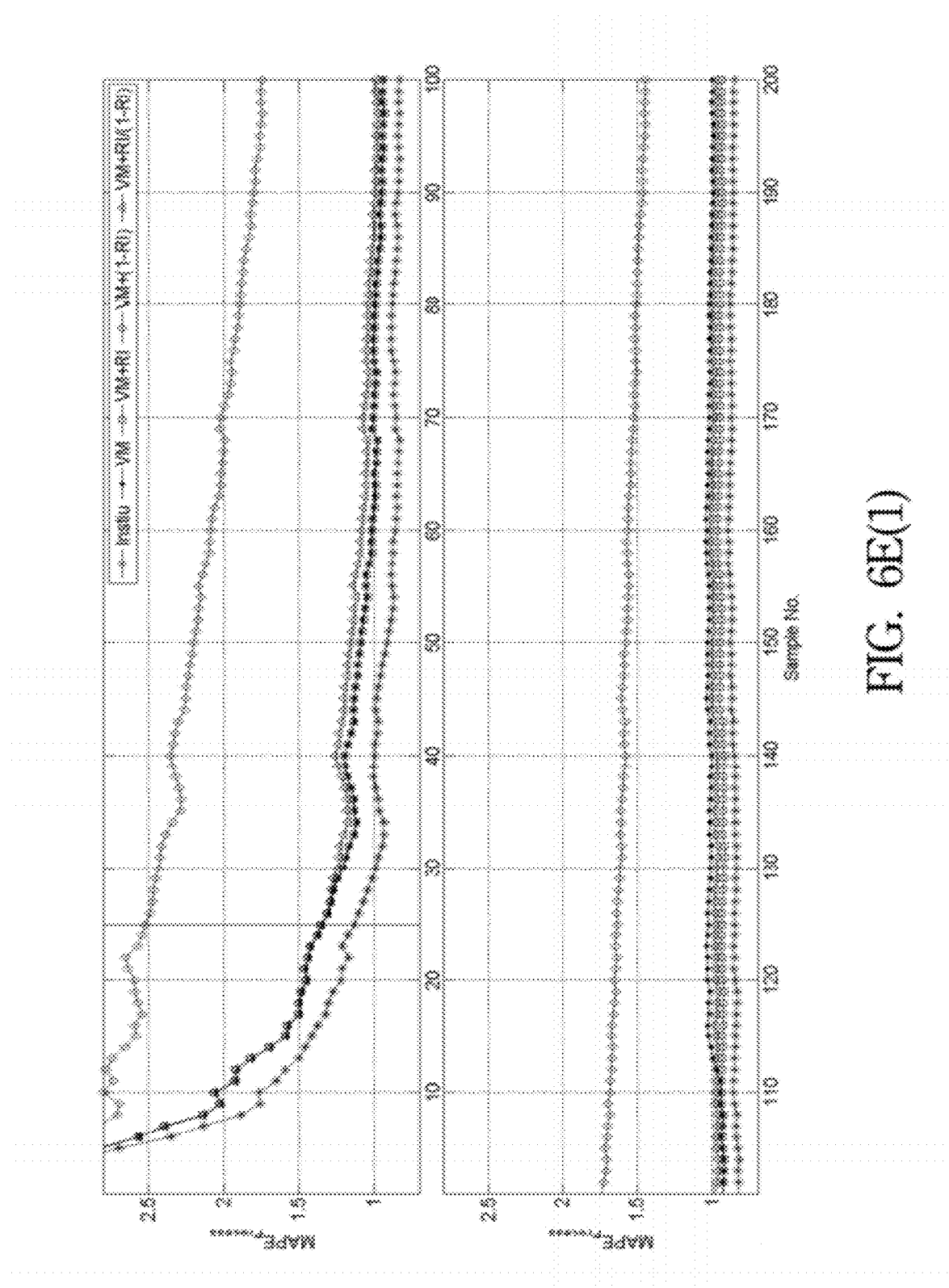
FIG. 6E(1)

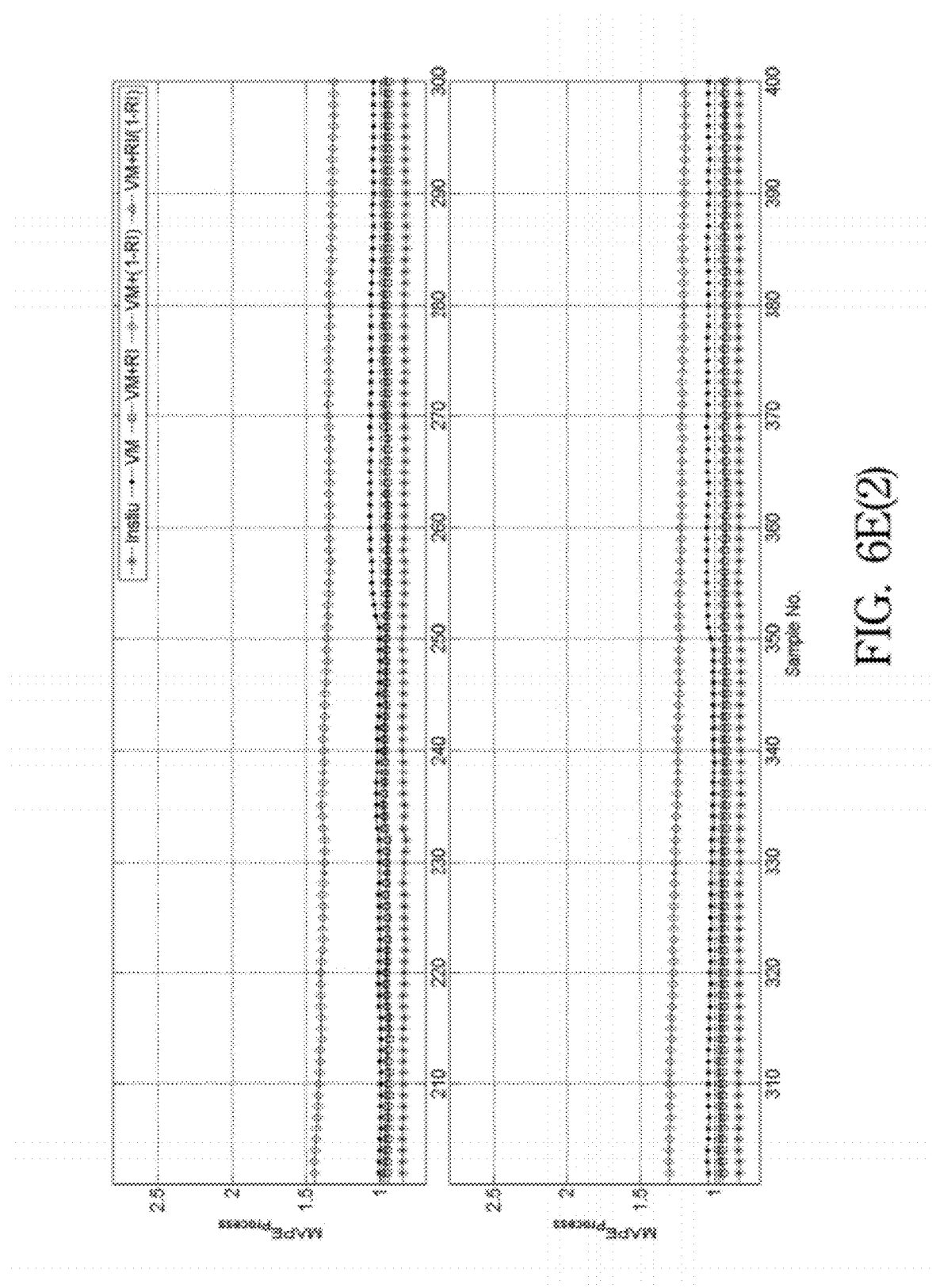
FIG. 6E(2)

ADVANCED PROCESS CONTROL SYSTEM AND METHOD UTILIZING VIRTUAL METROLOGY WITH RELIANCE INDEX

RELATED APPLICATIONS

The present application is based on, and claims priority from, U.S. provisional Application Ser. No. 61/369,761, filed Aug. 2, 2010, the disclosure of which is hereby incorporated by reference herein in its entirety.

BACKGROUND

1. Field of Invention

The present invention relates to an advanced process control (APC) system and an APC method. More particularly, the present invention relates to an APC system and an APC method utilizing virtual metrology (VM) with a reliance index (RI).

2. Description of Related Art

Run-to-run (R2R) advanced process control (APC) is widely applied to semiconductor and TFT-LCD factories for improving process capability. As defined in SEMI E133 specification, a R2R control is the technique of modifying recipe parameters or the selection of control parameters between runs to improve processing performance. A (process) run can be a batch, a lot, or an individual workpiece, wherein the R2R APC becomes a lot-to-lot (L2L) APC when a run is a lot, and the R2R APC becomes a workpiece-to-workpiece (W2W) APC when a run is a workpiece. A workpiece may represent a wafer for the semiconductor industry or a glass for the TFT-LCD industry. The L2L APC is now widely implemented for dealing with advanced technologies. When a L2L control is applied, only one single workpiece in the lot is required to be measured for feedback and feedforward control purposes. However, as the device dimension shrinks further, tighter process control is needed. In this case, the L2L control may not be accurate enough and therefore a W2W control becomes essential for critical stages. As a result, each workpiece in the lot should be measured. To fulfill this requirement, large amounts of metrology tools will be required and production cycle time will also be increased significantly. Furthermore, metrology delays, which are inevitable as real measurements are performed, will not only cause complicated control problems but also degrade the APC performance.

To resolve the problem mentioned above, virtual metrology (VM) was proposed. Virtual metrology is a technology using a conjecture model to predict metrology variables using information about the state of the process for every workpiece. If the VM conjecture model is fresh and accurate enough, it can generate a VM value within seconds after collecting the complete tool process data of a workpiece. Therefore, this VM value can be applied for real-time W2W control.

Referring to FIG. 1, FIG. 1 is a schematic block diagram showing a conventional model of EWMA (Exponentially Weighted Moving Average) R2R control disclosed by the paper entitled "Performance Analysis of EWMA Controllers Subject to Metrology Delay", M.-F. Wu, C.-H. Lin, D. S.-H. Wong, S.-S. Jang, and S.-T. Tseng, published in IEEE Transactions on Semiconductor Manufacturing, vol. 21, no. 3, pp. 413-425, August 2008, which is incorporated herein by reference. Let us consider a process model with linear input and output relationship:

$$y_k = \beta_0 + \beta_1 u_k + \eta_k \quad (1)$$

where $y_k$ is the plant output; $u_k$ the control action taken for process run k; $\beta_0$ the initial bias of process; $\beta_1$ the process gain; and $\eta_5$ the disturbance model input.

Given a process predictive model $Au_k$, where A is a gain parameter (e.g., removal rate for chemical mechanical polishing (CMP)) estimated for the system, and its initial values can be obtained from the actual tool/recipe performance.

Using an EWMA (Exponentially Weighted Moving Average) filter, the model offset or disturbance of the $(k+1)^{th}$ process run is estimated to be $$\tilde{\eta}_{k+1} = \alpha(y_k - Au_k) + (1-\alpha)\tilde{\eta}_k \quad (2)$$

where $\alpha$ is an EWMA coefficient ranged between 0 and 1.

Control action of $(k+1)^{th}$ process run is $$u_{k+1} = \frac{Tgt - \tilde{\eta}_{k+1}}{A} \quad (3)$$

where Tgt represents the target value.

Referring to FIG. 2, FIG. 2 is a schematic block diagram showing a conventional W2W control scheme utilizing virtual metrology (VM), wherein $y_z$ is the $z^{th}$ process run of actual measurement value of the sampling product (workpiece) measured by a metrology tool 20; $\hat{y}_k$ is the $k^{th}$ process run of VM data; and $X_k$ is the $k^{th}$ process run of process data of a process tool 10. In the paper entitled "On the Quality of Virtual Metrology Data for Use in the feedback Process Control", A. A. Khan, J. R. Moyne, and D. M. Tilbury, published in Proc. AEC/APC Symposium XIX—North America, Palm Springs, Calif. USA, September 2007; the paper entitled "An Approach for Factory-Wide Control Utilizing Virtual Metrology", A. A. Khan, J. R. Moyne, and D. M. Tilbury, published in IEEE Transactions on Semiconductor Manufacturing, vol. 20, no. 4, pp. 364-375, November 2007; and the paper entitled "Virtual Metrology and Feedback Control for Semiconductor Manufacturing Process Using Recursive Partial Least Squares", A. A. Khan, J. R. Moyne, and D. M. Tilbury, published in Journal of Process Control, vol. 18, pp. 961-974, 2008, which are incorporated herein by reference, Khan et al. proposed a W2W control scheme utilizing VM. Khan et al. proposed to modify the above equation (2) for a R2R controller 40 as follows:

When $y_k$ is measured by the actual metrology tool 20, it becomes $y_z$, an EWMA coefficient $\alpha_1$ is used in $$\tilde{\eta}_{k+1} = \alpha_1(y_z - Au_k) + (1-\alpha_1)\tilde{\eta}_k \quad (4)$$

When $y_k$ is conjectured or predicted by a VM module 30, it becomes $\hat{y}_k$, i.e. a VM value $\hat{y}_k$ and an EWMA coefficient $\alpha_2$ is used in $$\tilde{\eta}_{k+1} = \alpha_2(\hat{y}_k - Au_k) + (1-\alpha_2)\tilde{\eta}_k \quad (5)$$

Khan et al. pointed out that $\alpha_1 > \alpha_2$ (usually, depending on the relative quality of virtual metrology data). Now, the controller-gain problem of applying VM is focused on how to set $\alpha_2$, wherein the rule of thumb is that $\alpha_2$ should depend on the quality or reliability of VM and $\alpha_2 < \alpha_1$. Khan et al. proposed two VM quality metrics to consider incorporating VM quality into the controller gain of a R2R controller 40:

1. Prediction error at metrology runs:

$$\text{Error} = y - \hat{y} \quad (6)$$

2. If y and ŷ are zero-mean Gaussian deviations from targets, then Min mean-square-error (MSE) estimator of y based on ŷ is $$y_{mmse} = \rho \frac{\sigma_y}{\sigma_{\hat{y}}} \quad (7)$$

where the correlation coefficient $$\rho = \frac{\text{cov}[y, \hat{y}]}{\sigma_y \sigma_{\hat{y}}} \quad (8)$$

and $\sigma_y$ and $\sigma_{\hat{y}}$ are standard deviations of y and $\hat{y}$, respectively.

Nevertheless, both metrics proposed above have the following disadvantages:

1. Both equations (6) & (7) need actual metrology data "y"; however, if actual metrology data (measurement values) (y) are available, then no virtual metrology value ($\hat{y}$) are needed at all.
2. The value of $y_{mmse}$ may not be normalized to be between 0~1 because $y_{mmse}$ may be positive or negative due to $\rho$.

As a result, it may not be easy to combine the data quality metrics as in equations (6) and (7) into the R2R model. Hence, there is a need to develop an APC system and an APC method utilizing VM with a reliance index (RI) and a global similarity index (GSI) for effectively considering the data quality of VM into the R2R controller.

SUMMARY

An object of the present invention is to provide an APC system and an APC method for effectively considering the data quality of VM into a R2R controller, thereby overcoming the problems of inability to consider the reliance level in the VM feedback loop of R2R control and metrology delays as well as upgrading the APC performance.

According to an aspect of the present invention, an APC system includes a process tool, a metrology tool, a virtual metrology (VM) module, a reliance index (RI) module and a run-to-run (R2R) controller. The process tool is operated for processing a plurality of historical workpieces in accordance with a plurality of sets of historical process data, and performing a plurality of process runs on a plurality of workpieces in accordance with a plurality of sets of process data. The metrology tool is operated for measuring the historical workpieces and a plurality of sampling workpieces selected from the workpieces, thereby providing a plurality of historical measurement data of the historical workpieces and a plurality of actual measurement values of the sampling workpieces which have been processed in the process runs. The virtual metrology module is used for providing a plurality of virtual metrology values of the process runs by inputting the sets of process data into a conjecture model, wherein the conjecture model is built in accordance with a conjecture algorithm by using the sets of historical process data and the historical measurement values, wherein the historical measurement values are the measurement values of the historical workpieces which are manufactured in accordance with the sets of historical process data, respectively. The RI module is used for generating respective reliance indexes (RI) of the process runs, wherein each of the reliance indexes (RI) corresponding to the process run is generated by calculating the overlap area between the statistical distribution of the virtual metrology value of the workpiece and the statistical distribution of a reference prediction value of the workpiece, wherein the reference prediction value of the process run is generated by inputting the set of process data into a reference model, wherein the reference model is built in accordance with a reference algorithm by using the sets of historical process data and their corresponding historical measurement values, and the conjecture algorithm is different from the reference algorithm, and the reliance index is higher when the overlap area is larger, representing that the reliance level of the virtual metrology value corresponding to the reliance index is higher. The R2R controller is operated for controlling the process tool to perform the process runs in accordance with the following relationships:

$$u_{z+1} = g(G_{1,1}, G_{1,2}, \ldots, G_{1,i}, y_z)$$

$$u_{k+1} = g(G_{2,1}, G_{2,2}, \ldots, G_{2,i}, \hat{y}_k)$$

$$G_{2,i} = f(RI_k) \times G_{1,i}$$

where $G_{2,i}=0$ or $\hat{y}_{k-1}$ but not $\hat{y}_k$ is adopted for tuning the R2R controller, if $RI_k < RI_T$;

$f(RI_k) = RI_k$, if $RI_k \geq RI_T$ and $k \leq C$;

$f(RI_k) = 1 - RI_k$, if $RI_k \geq RI_T$ and $k > C$;

wherein $y_z$ represents the actual measurement value of the sampling workpiece which has been processed in the $z^{th}$ process run; $u_{z+1}$ represents the control action of the $(z+1)^{th}$ process run when $y_z$ is adopted; $G_{1,i}$ represents the controller gain used in the R2R controller when $y_z$ is adopted, wherein i represents the number of the controller gains used in the R2R controller; $\hat{y}_k$ represents the virtual metrology value of the workpiece which has been processed in the $k^{th}$ process run; $u_{k+1}$ represents the control action of the $(k+1)^{th}$ process run when $\hat{y}_k$ is adopted; $G_{2,i}$ represents the controller gain used in the R2R controller when $\hat{y}_k$ is adopted; $RI_k$ represents the reliance index (RI) of the $k^{th}$ process run; $RI_T$ represents the RI threshold value based on a maximal tolerable error limit defined by the errors of the virtual metrology values obtained from the conjecture model; and C stands for a predetermined number of process runs.

In one embodiment, the APC system further includes a global similarity index (GSI) module for generating respective global similarity indexes (GSI) of the process runs by inputting the sets of process data into a statistical distance model, wherein the statistical distance model is built in accordance with a statistical distance algorithm by using the sets of historical process data, wherein $G_{2,i}=0$ or $\hat{y}_{k-1}$ but not $\hat{y}_k$ is adopted for tuning the R2R controller, if $GSI_k > GSI_T$, where $GSI_k$ represents the global similarity index (GSI) of the kth process run; $GSI_T$ represents a GSI threshold value defined by two to three times of the maximal global similarity indexes of the sets of historical process data.

According to another aspect of the present invention, in an APC method, a step is performed for obtaining a plurality of sets of historical process data used by a process tool for processing a plurality of historical workpieces. Another step is performed for obtaining a plurality of historical measurement data of the historical workpieces measured by a metrology tool. Another step is performed for establishing a conjecture model in accordance with a conjecture algorithm by using the sets of historical process data and the historical measurement values, wherein the historical measurement values are the measurement values of the historical workpieces which are manufactured in accordance with the sets of historical process data, respectively; and establishing a reference model in accordance with a reference algorithm by using the sets of historical process data and their corresponding historical measurement values, wherein the conjecture algorithm is different from the reference algorithm. Another step is performed for enabling a run-to-run (R2R) controller to control the process tool to perform the process runs in accordance with the aforementioned relationships.

In one embodiment, the APC method further includes establishing a statistical distance model in accordance with a statistical distance algorithm by using the sets of historical process data; and enabling the R2R controller to control the process tool to perform the process runs in accordance with the relationship: $G_{2,i}=0$ or $\hat{y}_{k-1}$ but not $\hat{y}_k$ is adopted for tuning the R2R controller, if $GSI_k > GSI_T$, where $GSI_k$ represents the global similarity index (GSI) of the kth process run; $GSI_T$ represents a GSI threshold value defined by two to three times of the maximal global similarity indexes of the sets of historical process data.

According to another aspect of the present invention, a computer program product is provided and performs the aforementioned APC method when executed.

Hence, with the application of the embodiments of the present invention, the data quality of VM can be effectively considered into the R2R model, thereby overcoming the problems of inability to consider the reliance level in the VM feedback loop of R2R control and metrology delays as well as upgrading the APC performance.

BRIEF DESCRIPTION OF THE DRAWINGS

These and other features, aspects, and advantages of the present invention will become better understood with regard to the following description, appended claims, and accompanying drawings where:

FIG. 6A to FIG. 6E show the simulation results of five cases for the first 400 workpieces;

DESCRIPTION OF THE PREFERRED EMBODIMENTS

Figure 1:
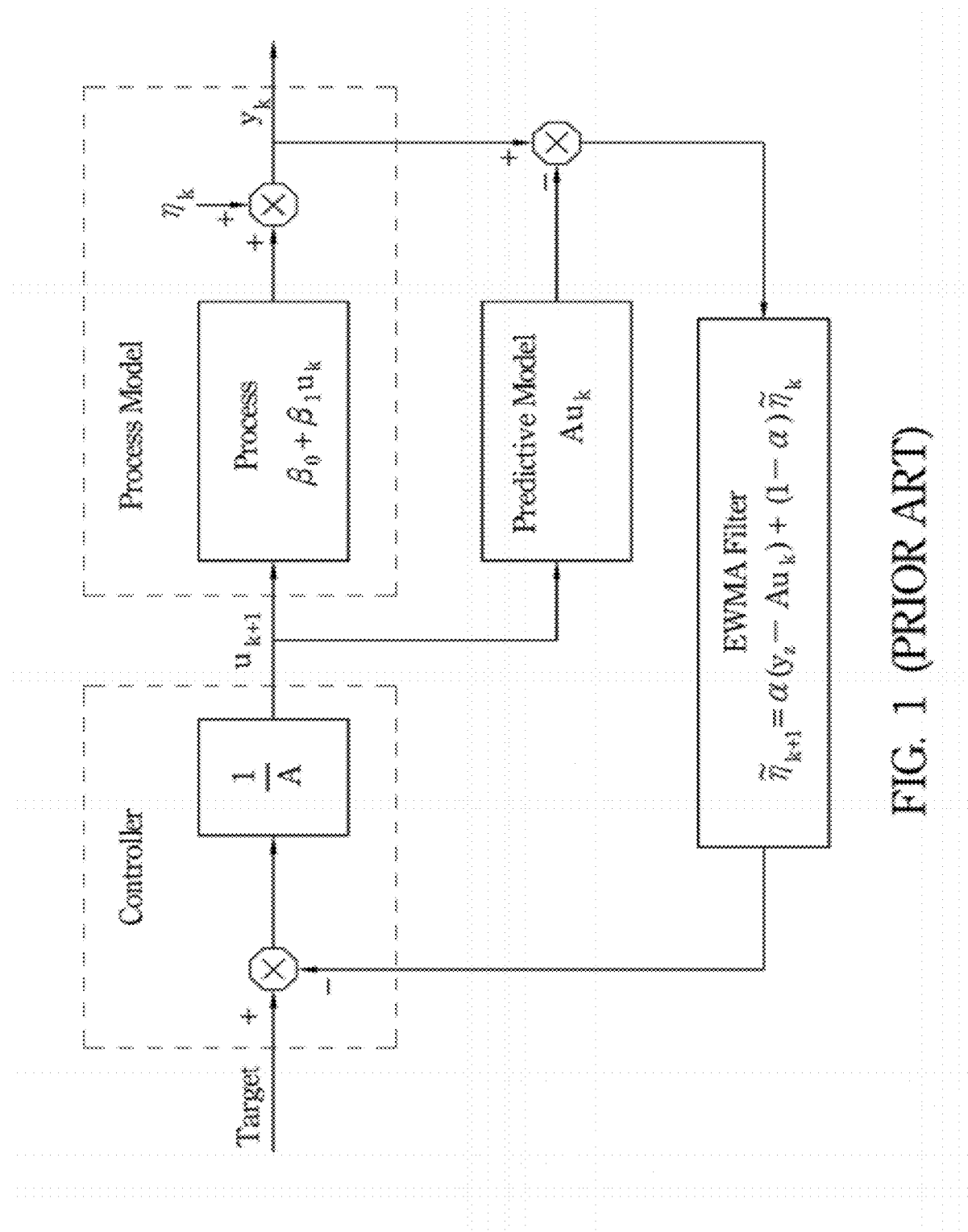
FIG. 1 is a schematic block diagram showing a conventional model of EWMA R2R control.
Figure 2:
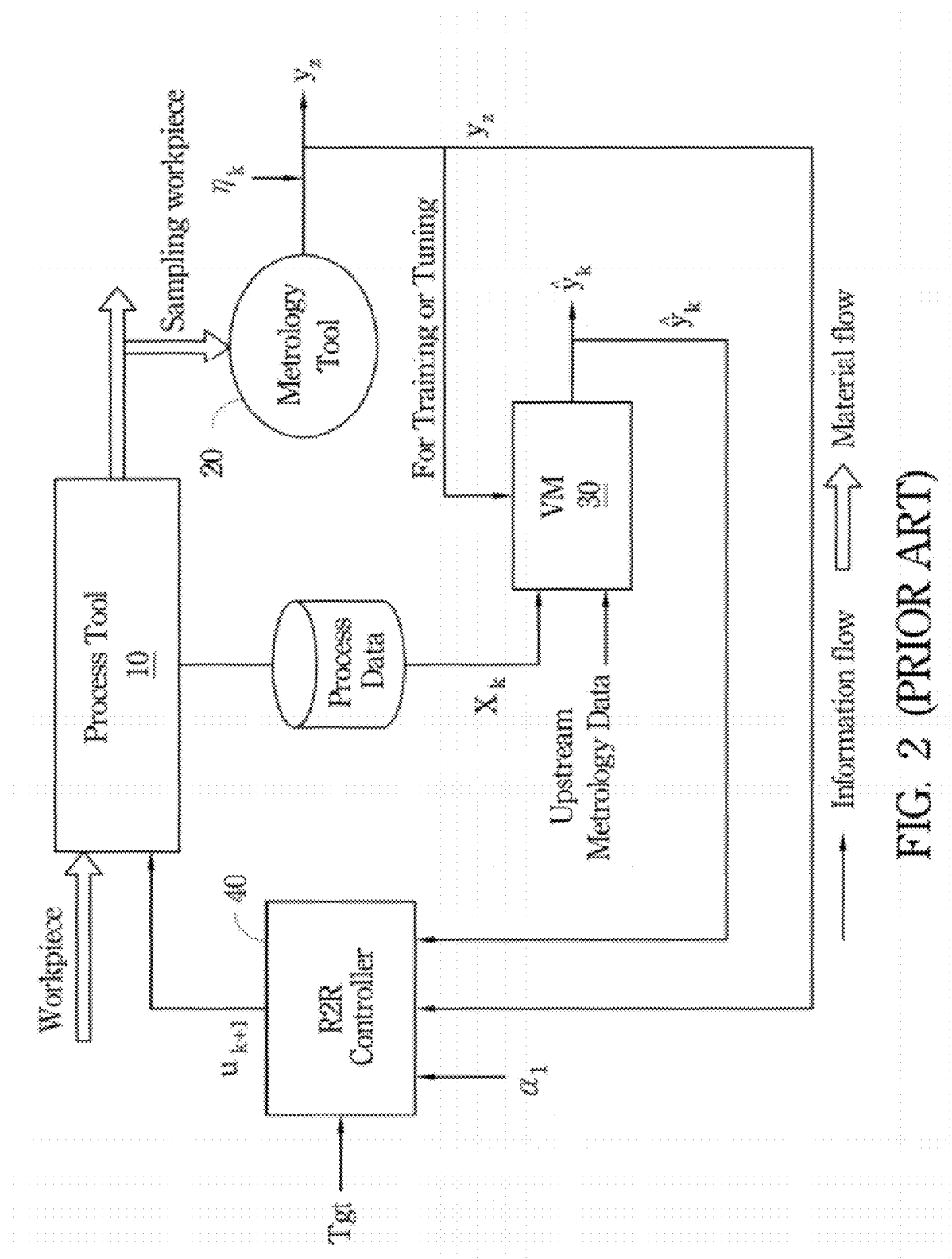
FIG. 2 is a schematic block diagram showing a conventional W2W control.

Reference will now be made in detail to the embodiments of the present invention, examples of which are illustrated in the accompanying drawings. Wherever possible, the same reference numbers are used in the drawings and the description to refer to the same or like parts.

Figure 3A:
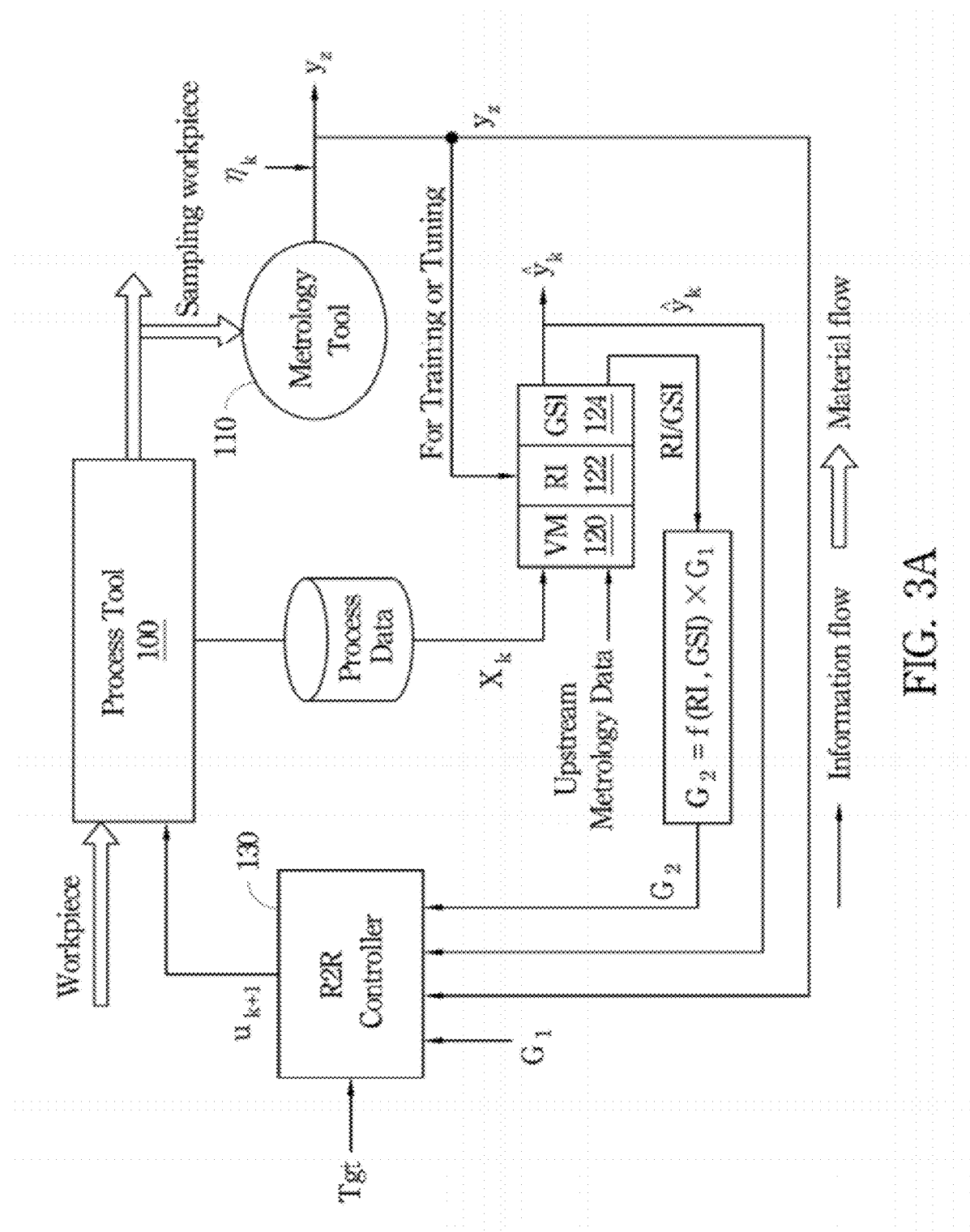
FIG. 3A is a schematic diagram showing a W2W APC system according to an embodiment of the present invention.

Referring to FIG. 3A, FIG. 3A is a schematic diagram showing an APC system according to an embodiment of the present invention. The APC system of this embodiment includes a process tool 100, a metrology tool 110, a virtual metrology (VM) module 120, a reliance index (RI) module 122, a global similarity index (GSI) module 124 and a run-to-run (R2R) controller 130. The process tool 100 is operated for processing a plurality of historical workpieces in accordance with a plurality of sets of historical process data, and also can be operated for performing a plurality of process runs on a plurality of workpieces in accordance with a plurality of sets of process data. A process run is the unit controlled by the R2R controller 130, wherein when a process run is a lot, the R2R controller 130 is a L2L controller which controls the process tool 100 lot by lot; when a process run is a workpiece, the R2R controller 130 is a W2W controller which controls the process tool 100 workpiece by workpiece. In general, a lot contains a plurality of workpieces, for example, 25 workpieces, meaning that the L2L controller controls one process run (lot) to process 25 workpieces with one set of process data. The metrology tool 110 is operated for measuring the historical workpieces and a plurality of sampling workpieces selected from the workpieces, thereby providing a plurality of historical measurement data of the historical workpieces and a plurality of actual measurement values of the sampling workpieces which have been processed in the process runs.

For the VM module 120, the RI module 122 and the GSI module 124, a conjecture model, a reference model and a statistical distance model are required to be built. The conjecture model is built in accordance with a conjecture algorithm by using the sets of historical process data and the historical measurement values, wherein the historical measurement values are the measurement values of the historical workpieces which are manufactured in accordance with the sets of historical process data, respectively; the reference model is built in accordance with a reference algorithm by using the sets of historical process data and their corresponding historical measurement values; and the statistical distance model is built in accordance with a statistical distance algorithm by using the sets of historical process data. The conjecture algorithm and the reference algorithm can be a multi-regression (MR) algorithm, a support-vector-regression (SVR) algorithm, a neural-networks (NN) algorithm, a partial-least-squares regression (PLSR) algorithm, or a Gaussian-process-regression (GPR) algorithm. The statistical distance model can be a Mahalanobis-distance algorithm or an Euclidean-distance algorithm. The aforementioned algorithms are merely stated as examples, and certainly other algorithms may be applicable to the present invention. The RI and GSI used in the embodiment of the present invention can be referred to U.S. Pat. No. 7,593,912 entitled "Method for evaluating reliance level of a virtual metrology system in product manufacturing", which is incorporated herein by reference. The RI, GSI and VM models used in the embodiment of the present invention can be referred to U.S. Pat. No. 7,603,328 entitled "Dual-phase virtual metrology method"; and US Patent Publication No. 20090292386 entitled "System and Method for Automatic Virtual Metrology", which are incorporated herein by reference. It is noted that U.S. Pat. Nos. 7,593,912, 7,603,328 and US Patent Publication No. 20090292386 all have the same assignee as this application.

The VM module 120 is used for providing a plurality of virtual metrology (VM) values of the process runs by inputting the sets of process data into the conjecture model. The RI module 122 is used for generating respective reliance indexes (RI) of the process runs, wherein each of the reliance indexes (RI) corresponding to the process run is generated by calculating the overlap area between the statistical distribution of the virtual metrology value of the workpiece and the statistical distribution of a reference prediction value of the workpiece, wherein the reference prediction value of the process run is generated by inputting the set of process data into the reference model. The RI module 122 mainly uses another algorithm (reference algorithm) to gauge the reliance level of the conjecture algorithm, and thus the conjecture algorithm and the reference algorithm can be any algorithms as long as the conjecture algorithm is different from the reference algorithm. The reliance index is higher when the aforementioned overlap area is larger, representing that the reliance level of the virtual metrology value corresponding to the reliance index is higher. In this embodiment, a RI threshold value ($RI_T$) is based on a maximal tolerable error limit defined by the errors of the virtual metrology values obtained from the conjecture model. The GSI module 124 is used for generating respective global similarity indexes (GSI) of the process runs by inputting the sets of process data into the statistical distance model. The GSI assesses the degree of similarity between any set of process data and the model set of process data (for example, the historical process data). In this embodiment, a GSI threshold value ($GSI_T$) is defined by two to three times of the maximal global similarity indexes of the sets of historical process data.

Hereinafter, the R2R controller 130 is exemplified as an EWMA controller for explanation, but the R2R controller 130 also can be a moving-average (MA) controller, double-EWMA controller (d-EWMA) or a proportional-integral-derivative (PID) controller.

Figure 3B:
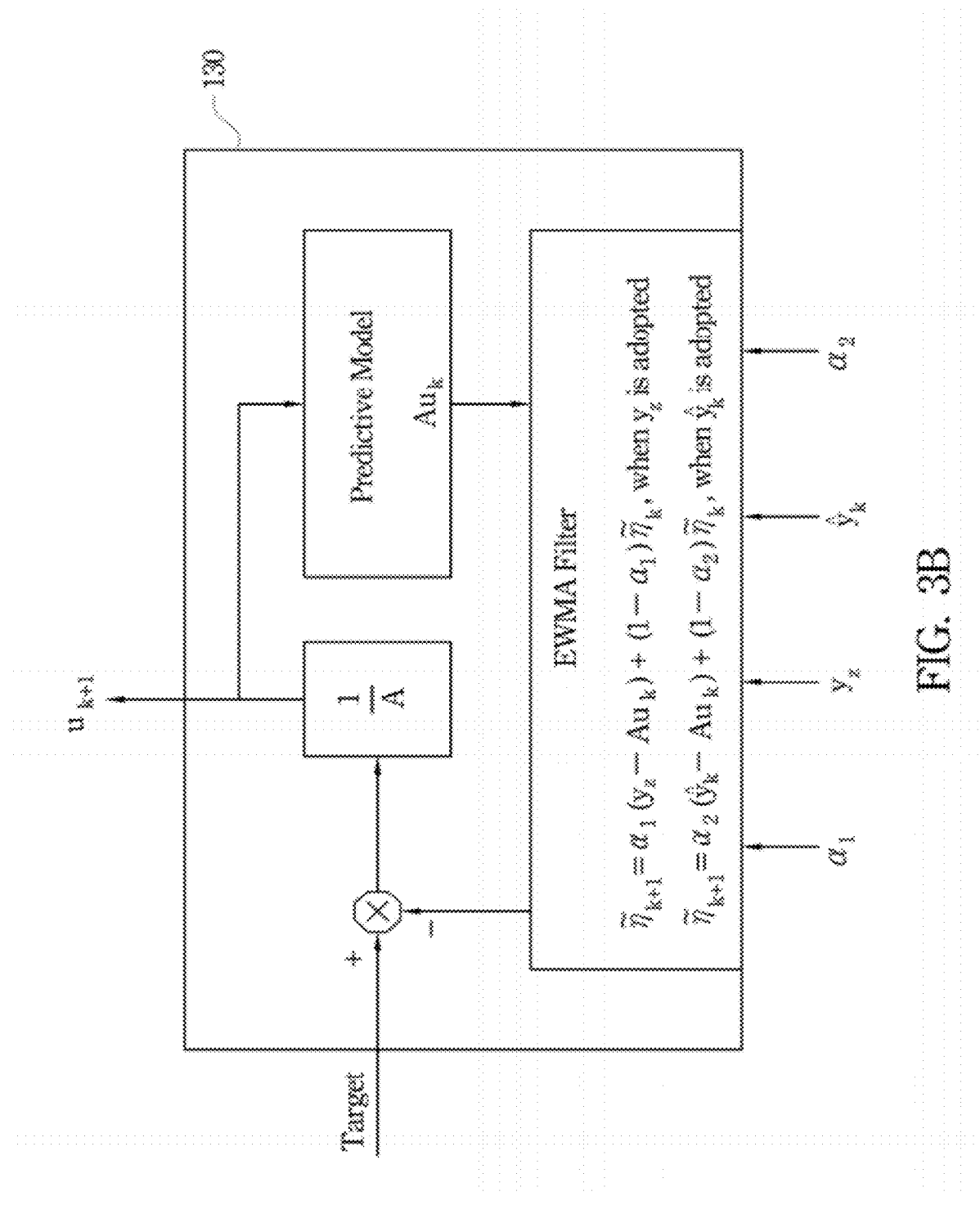
FIG. 3B is a schematic diagram showing an EWMA controller according to an embodiment of the present invention.

Referring to FIG. 3B, FIG. 3B is a schematic diagram showing an EWMA controller according to an embodiment of the present invention. Embodiments of the present invention are featured in overcoming the controller-gain problem of applying VM regarding how to set the EWMA coefficient $\alpha_2$ in equation (5). The rule of thumb is that $\alpha_2$ should depend on the quality or reliability of VM values and $\alpha_2 < \alpha_1$. The embodiments of the present invention use a reliance index (RI) and a global similarity index (GSI) to gauge the quality or reliability of VM values. Because the value of RI is a good VM reliability evaluation index and $0 < RI < 1$, higher RI means better VM reliability, and then the EWMA coefficient $\alpha_2$ can be naturally set as follows:

$$\alpha_2 = RI \times \alpha_1 \qquad (9)$$

wherein the EWMA coefficient $\alpha_1$ is the same as the $\alpha$ of equation (2).

Equation (9) will be applied when the R2R controller 130 needs relatively high gain. The situations that need high controller gain are: $y_k$ is apart from the target value or the production process is relatively unstable. On the contrary, if $y_k$ is near the target or the production process is relatively stable, then the controller gain should be small. For generating a small controller gain, the EWMA coefficient $\alpha_2$ also can be set as follows:

$$\alpha_2 = (1 - RI) \times \alpha_1 \qquad (10)$$

Equations (9) and (10) are valid only when RI is good enough; in other words, RI should be greater than $RI_T$. If $RI < RI_T$, this VM value cannot be adopted for tuning the R2R controller gain. Further, due to the fact that the GSI is designed to help the RI gauge the reliance level of VM, when $GSI > GSI_T$, its corresponding VM value cannot be adopted, either. In conclusion, if $RI < RI_T$ or $GSI > GSI_T$, then $\alpha_2$ is set to be zero (0).

The issue of the R2R controller-gain management in real-production environment whenever a modification is performed on the process tool 100 is considered as follows. In general, the production process of the first lot (just after a modification is performed) is relatively unstable; therefore, the controller gain should be relatively high. After finishing the production of the first lot, the production process will become comparatively stable. In other words, the rest of the lots should have small controller gains.

In summary, $\alpha_2$ can be set as:

$$\alpha_2 = f(RI, GSI) \times \alpha_1 \qquad (11)$$

$$f(RI, GSI) = \begin{cases} 0, & \text{if } RI < RI_T \text{ or } GSI > GSI_T \\ RI, & \text{if } RI \geq RI_T \text{ and } GSI \leq GSI_T \text{ and for } k \leq C \\ 1 - RI, & \text{if } RI \geq RI_T \text{ and } GSI \leq GSI_T \text{ and for } k > C \end{cases} \qquad (12)$$

C stands for a predetermined number of process runs. For a W2W control, C can be 25 for semiconductor industries.

Since the R2R controller 130 also can be a MA controller, a d-EWMA controller or a PID controller, a generic form of governing equations is provided as follows:

$$u_{z+1} = g(G_{1,1}, G_{1,2}, \ldots, G_{1,i}, y_z) \qquad (13)$$

$$u_{k+1} = g(G_{2,1}, G_{2,2}, \ldots, G_{2,i}, \hat{y}_k) \qquad (14)$$

$$G_{2,i} = f(RI_k, GSI_k) \times G_{1,i} \qquad (15)$$

where $G_{2,i} = 0$ or $\hat{y}_{k-1}$ but not $\hat{y}_k$ is adopted for tuning the R2R controller, if $RI_k < RI_T$ or $GSI_k > GSI_T$;

$f(RI_k, GSI_k) = RI_k$, if $RI_k \geq RI_T$ and $GSI_k \leq GSI_T$ and $k \leq C$;

$f(RI_k, GSI_k) = 1 - RI_k$, if $RI_k \geq RI_T$ and $GSI_k \leq GSI_T$ and $k > C$;

wherein $y_z$ represents the actual measurement value of the sampling workpiece which has been processed in the $z^{th}$ process run; $u_{z+1}$ represents the control action of the $(z+1)^{th}$ process run when $y_z$ is adopted; $G_{1,i}$ represents the controller gain used in the R2R controller when $y_z$ is adopted, wherein i represents the number of the controller gains used in the R2R controller; $\hat{y}_k$ represents the virtual metrology value of the workpiece which has been processed in the $k^{th}$ process run; $u_{k+1}$ represents the control action of the $(k+1)^{th}$ process run when $\hat{y}_k$ is adopted; $G_{2,i}$ represents the controller gain used in the R2R controller when $\hat{y}_k$ is adopted; $RI_k$ represents the reliance index (RI) of the $k^{th}$ process run; $RI_T$ represents a RI threshold value based on a maximal tolerable error limit defined by the errors of the virtual metrology values obtained from the conjecture model; $GSI_k$ represents the global similarity index (GSI) of the $k^{th}$ process run; $GSI_T$ represents a GSI threshold value defined by two to three times of the maximal global similarity indexes of the sets of historical process data; and C stands for a predetermined number of process runs.

The MA controller and the EWMA controller which are single-gain controllers; and the d-EWMA controller, and the PID controller which are multiple-gain controllers are described below.

MA Controller

The $(z-1)^{th}$ run control action, $u_{z+1}$, of an n-terms MA controller is derived by $$u_{z+1} = \frac{Tgt_{z+1} - \tilde{\eta}_{z+1}}{A} \qquad (16)$$

where A is a gain parameter (e.g., removal rate for chemical mechanical to polishing (CMP)) estimated for the system; $Tgt_{z+1}$ is the target value of $(z+1)^{th}$ run; and $\tilde{\eta}_{z+1}$ is the model offset or disturbance of the $(z+1)^{th}$ run. $\tilde{\eta}_{z+1}$ of the n-terms MA controller is expressed as:

$$\tilde{\eta}_{z+1} = \frac{1}{n}(y_z - Au_z) + \frac{1}{n}(y_{z-1} - Au_{z-1}) + \ldots + \frac{1}{n}(y_{z-(n-1)} - Au_{z-(n-1)}) \quad (17)$$

$$= \frac{1}{n}\sum_{i=1}^{n}(y_{z-(i-1)} - Au_{z-(i-1)})$$

$$= \frac{1}{n}(1 + q^{-1} + q^{-2} + \ldots + q^{-(n-1)})(y_z - Au_z)$$

$$= M_1 h_{MA}(q)(y_z - Au_z)$$

where $y_z$ represents the actual measurement value of the $z^{th}$ run control output; q represents the delay operator, i.e. $q^{-1}y_z = y_{z-1}$; $M_1 = 1/n$ is the controller gain; and $$h_{MA}(q) = (1 + q^{-1} + \ldots + q^{-(n-1)}) \quad (18)$$

Then, from equation (16), $$u_{z+1} = \frac{Tgt_{z+1} - \tilde{\eta}_{z+1}}{A} \quad (19)$$

$$= \frac{Tgt_{z+1} - M_1 h_{MA}(q)(y_z - Au_z)}{A}$$

$$= g_{MA}(M_1, y_z)$$

In conclusion, the $(z+1)^{th}$ run control action, $u_{z+1}$, of an n-terms MA controller can be expressed as a function of the actual measurement value of the $z^{th}$ control output, $y_z$, and the controller gain, $M_1$.

EWMA Controller

The $(z+1)^{th}$ run control action, $u_{z+1}$, of an EWMA controller can also be expressed as equation (16).

For the EWMA controller, $\tilde{\eta}_{z+1}$ is derived below.

$$\tilde{\eta}_{z+1} = \alpha_1(y_z - Au_z) + (1 - \alpha_1)\tilde{\eta}_z \quad (20)$$

$$= \alpha_1(y_z - Au_z) + \alpha_1(1 - \alpha_1)(y_{z-1} - Au_{z-1}) +$$

$$\alpha_1(1 - \alpha_1)^2(y_{z-2} - Au_{z-2}) + \ldots +$$

$$\alpha_1(1 - \alpha_1)^i(y_{z-i} - Au_{z-i}) + \ldots +$$

$$\alpha_1(1 - \alpha_1)^{z-1}(y_1 - Au_1) + (1 - \alpha_1)^z \tilde{\eta}_0$$

$$= \sum_{i=1}^{z} \alpha_1(1 - \alpha_1)^{z-i}(y_i - Au_i),$$

for initial condition $\tilde{\eta}_0 = 0$.

Let
$c_0 = \alpha_1$
$c_1 = \alpha_1(1 - \alpha_1)$
$c_2 = \alpha_1(1 - \alpha_1)^2$
$\vdots$
$c_i = \alpha_1(1 - \alpha_1)^i$
$\vdots$
$c_{z-1} = \alpha_1(1 - \alpha_1)^{z-1}$ then $$\tilde{\eta}_{z+1} = (c_0 + c_1 \cdot q^{-1} + \ldots + c_i \cdot q^{-i} + \ldots + c_{z-1} \cdot q^{-(z-1)}) \quad (21)$$

$$(y_z - Au_z)$$

$$= \alpha_1 h_{EWMA}(\alpha_1, q)(y_z - Au_z)$$

and $$h_{EWMA}(\alpha_1, q) = \quad (22)$$

$$[1 + (1 - \alpha_1)q^{-1} + (1 - \alpha_1)^2 q^{-2} + \ldots + (1 - \alpha_1)^{z-1} q^{-(z-1)}]$$

-continued $$u_{z+1} = \frac{Tgt_{z+1} - \tilde{\eta}_{z+1}}{A} \quad (23)$$

$$= \frac{Tgt_{z+1} - \alpha_1 h_{EWMA}(\alpha_1, q)(y_z - Au_z)}{A}$$

$$= g_{EWMA}(\alpha_1, y_z)$$

In conclusion, the $(z+1)^{th}$ run control action, $u_{z+1}$, of an EWMA controller can be expressed as a function of the actual measurement value of the $z^{th}$ run control output, $y_z$, and the controller gain, $\alpha_1$.

d-EWMA Controller

The $(z+1)^{th}$ run control action, $u_{z+1}$, a d-EWMA controller is expressed as:

$$u_{z+1} = \frac{Tgt_{z+1} - \tilde{\eta}_{z+1} - \tilde{\rho}_{z+1}}{A} \quad (24)$$

Referring to equations (20), (21), and (22), $\tilde{\eta}_{Z+1}$ can be expressed as:

$$\tilde{\eta}_{z+1} = \alpha_{1,1}(y_z - Au_z) + (1 - \alpha_{1,1})\tilde{\eta}_z \quad (25)$$

$$= \alpha_{1,1} h_{EWMA}(\alpha_{1,1}, q)(y_z - Au_z)$$

Similarly, $\tilde{\rho}_{Z+}$, is derived as:

$$\tilde{\rho}_{z+1} = \alpha_{1,2}(y_z - Au_z - \tilde{\eta}_z) + (1 - \alpha_{1,2})\tilde{\rho}_z \quad (26)$$

$$= \alpha_{1,2} h_{EWMA}(\alpha_{1,2}, q)(y_z - Au_z - \tilde{\eta}_z).$$

Finally, $u_{z+1}$ can be expressed as:

$$u_{z+1} = \frac{Tgt_{z+1} - \tilde{\eta}_{z+1} - \tilde{\rho}_{z+1}}{A} = g_{d-EWMA}(\alpha_{1,1}, \alpha_{1,2}, y_z) \quad (27)$$

In conclusion, the $(z+1)^{th}$ run control action, $u_{z+1}$, of a d-EWMA controller can be expressed as a function of the actual measurement value of the $z^{th}$ run control output, $y_z$, and the controller gains, $\alpha_{1,1}$ and $\alpha_{1,2}$.

PID Controller

The $(z+1)^{th}$ run control action, $u_{z+1}$, of a PID controller is expressed as:

$$u_{z+1} = K_{1,P}(y_z - Tgt_z) - K_{1,I}\frac{1}{1 - q^{-1}}(y_z - Tgt_z) - \quad (28)$$

$$K_{1,D}(1 - q^{-1})(y_z - Tgt_z)$$

$$= g_{PID}(K_{1,P}, K_{1,I}, K_{1,D}, y_z)$$

In conclusion, the $(z+1)^{th}$ run control action, $u_{z+1}$, of a PID controller can be expressed as a function of the actual measurement value of the $z^{th}$ run control output, $y_z$, and the controller gains, $K_{1,P}$, $K_{1,I}$, and $K_{1,D}$.

Observing equations (19), (23), (27), and (28), a generic form of the $(z+1)^{th}$ run control action, $u_{z+1}$, of the MA, EWMA, d-EWMA, and PID R2R controller can be generated as a function of the actual measurement value of the $z^{th}$ run control output, $y_z$, and the controller gains, $G_{1,1}, G_{1,2}, \ldots,$ and $G_{1,i}$, where i represented the number of gains existed in the controller.

$$u_{z+1} = g(G_{1,1}, G_{1,2}, \ldots, G_{1,i}, y_z) \tag{29}$$

For the MA case, i=1 and $G_{1,1}=M_1$; for EWMA, i=1 and $G_{1,1}=\alpha_1$; for d-EWMA, i=2, $G_{1,1}=\alpha_{1,1}$ and $G_{1,2}=\alpha_{1,2}$; for PID, i=3, $G_{1,1}=K_{1,P}$, $G_{1,2}=K_{1,I}$, and $G_{1,3}=K_{1,D}$. In fact, equation (29) has been mentioned in equation (13).

When VM is utilized, $y_z$ will be replaced by $\hat{y}_k$ and the controller gains will be changed to $G_{2,1}, G_{2,2}, \ldots,$ and $G_{2,i}$, where i represented the number of gains existed in the controller. Therefore, by utilizing VM, the generic form of the $(k+1)^{th}$ run control action, $u_{k+1}$, is $$u_{k+1} = g(G_{2,1}, G_{2,2}, \ldots, G_{2,i}, \hat{y}_k) \tag{30}$$

For the MA case, i=1 and $G_{2,1}=M_2$; for EWMA, i=1 and $G_{2,1}=\alpha_2$; for d-EWMA, i=2, $G_{2,1}=\alpha_{2,1}$ and $G_{2,2}=\alpha_{2,2}$ for PID, i=3, $G_{2,1}=K_{2,P}$, $G_{2,2}=K_{2,I}$, and $G_{2,3}=K_{2,D}$. In fact, equation (30) has been mentioned in equation (14).

When VM is adopted as the feedback of the R2R controller, VM's accompanying RI/GSI can be used to tune the controller gains as shown below:

$$G_{2,i} = f(RI, GSI) \times G_{1,i} \tag{31}$$

In fact, equation (31) has been mentioned in equation (15).
Specifically, for the MA case:

$$M_2 = f_{MA}(RI, GSI) \times M_1 \tag{32}$$

For the EWMA case:

$$\alpha_2 = f_{EWMA}(RI, GSI) \times \alpha_1 \tag{33}$$

For the d-EWMA case:

$$\alpha_{2,1} = f_{\alpha 1}(RI, GSI) \times \alpha_{1,1}$$

$$\alpha_{2,2} = f_{\alpha 2}(RI, GSI) \times \alpha_{1,2} \tag{34}$$

For the PID case:

$$K_{2,P} = f_P(RI, GSI) \times K_{1,P}$$

$$K_{2,I} = f_I(RI, GSI) \times K_{1,I}$$

$$K_{2,D} = f_D(RI, GSI) \times K_{1,D} \tag{35}$$

In conclusion, all of the $G_{1,i}$ controller gains may be assigned as constants or tuned by an adaptive scheme or function. When the actual measurement values ($y_z$) are adopted, $G_{1,i}$ will be designed and assigned accordingly. After $G_{1,i}$ are assigned and if the VM values ($\hat{y}_k$) are adopted to replace $y_z$, then the corresponding $G_{2,1}$ gains can be designed and assigned as shown in equations (31)-(35).

Equations (31)-(35) are valid only when RI and GSI are good enough; in other words, RI should be greater than $RI_T$ and GSI should be smaller than $GSI_T$. If $RI<RI_T$ or $GSI>GSI_T$, this VM value cannot be adopted for tuning the R2R controller gain. In conclusion, if $RI<RI_T$ or $GSI>GSI_T$, then for the MA case, set $\tilde{\eta}_{k+1}=\tilde{\eta}_k$, i.e. $\hat{y}_{k-1}$ but not $\hat{y}_k$ is adopted for tuning the R2R controller;
for the EWMA case, set $\tilde{\eta}_{k+1}=\tilde{\eta}_k$ or $\alpha_2=0$ (i.e. $G_{2,i}=0$);
for the d-EWMA case, set $\tilde{\eta}_{k+1}=\tilde{\eta}_k$ and $\bar{\rho}_{k+1}=\bar{\rho}_k$; or set $\alpha_{2,1}=\alpha_{2,2}=0$ (i.e. $G_{2,i}=0$);
for the PID case, set $u_{k+1}=u_k$, i.e. $\hat{y}_{k-1}$ but not $\hat{y}_k$ is adopted for tuning the R2R controller.

The following presents the algorithms related to the RI and explains their operating procedures.

Reliance Index (RI)

Referring to Table 1, n sets of historical data are assumed to be collected, including process data ($X_i$, i=1, 2, ..., n) and the corresponding actual measurement values ($y_i$, i=1, 2, ..., n), where each set of process data contains p individual parameters (from parameter 1 to parameter p), namely $X_i=[x_{i,1}, x_{i,2}, \ldots, x_{i,p}]^T$. Additionally, (m-n) sets of process data in actual production were also collected, but no actual measurement values are available besides $y_{n+1}$. That is, only the first among (m-n) pieces of the products is selected and actually measured. In the current manufacturing practice, the actual measurement value $y_{n+1}$ obtained is used to infer and evaluate the quality of the (m-n-1) pieces of the products.

TABLE 1

| Sample Data Set | Parameter 1 | Parameter 2 | Parameter p | Actual Measurement Value |
|---|---|---|---|---|
| 1 | $x_{1,1}$ | $x_{1,2}$ | ... $x_{1,p}$ | $y_1$ |
| 2 | $x_{2,1}$ | $x_{2,2}$ | ... $x_{2,p}$ | $y_2$ |
| ... | ... | ... | ... ... | ... |
| n | $x_{n,1}$ | $x_{n,2}$ | ... $x_{n,p}$ | $y_n$ |
| n + 1 | $x_{n+1,1}$ | $x_{n+1,2}$ | ... $x_{n+1,p}$ | $y_{n+1}$ |
| n + 2 | $x_{n+2,1}$ | $x_{n+2,2}$ | ... $x_{n+2,p}$ | Zip |
| ... | ... | ... | ... ... | ... |
| m | $x_{m,1}$ | $x_{m,2}$ | ... $x_{m,p}$ | Zip |

As shown in Table 1, $y_1, y_2, \ldots, y_n$ are historical measurement values, and $y_{n+1}$ is the actual measurement value of the first piece of the products being manufactured. Generally, a set of actual measurement values ($y_i$, i=1, 2, ..., n) is a normal distribution with mean $\mu$ and standard deviation $\sigma$, namely $y_i \sim N(\mu, \sigma^2)$.

All the actual measurement values can be standardized in terms of the mean and standard deviation of the sample set ($y_i$, i=1, 2, ..., n). Their standardized values (also called z scores) $Z_{y_1}, Z_{y_2}, \ldots, Z_{y_n}$ are thus derived, where each z score has mean zero and standard deviation one, namely $Z_{y_i} \sim N(0, 1)$. Regarding the actual measurement data, a corresponding $Z_{y_i}$ close to 0 indicates that the actual measurement value approaches the central value of the specification. The equations for standardization are listed as follows:

$$Z_{y_i} = \frac{y_i - \bar{y}}{\sigma_y}, i = 1, 2, \ldots, n \tag{36}$$

$$\bar{y} = \frac{1}{n}(y_1 + y_2 + \ldots + y_n) \tag{37}$$

$$\sigma_y = \sqrt{\frac{1}{n-1}[(y_1-\bar{y})^2 + (y_2-\bar{y})^2 + \ldots + (y_n-\bar{y})^2]} \tag{38}$$

wherein $y_i$ is the i-th actual measurement value,
  $Z_{y_i}$ is the standardized i-th actual measurement value,
  $\bar{y}$ is the mean of all the actual measurement values, and
  $\sigma_y$ is the standard deviation of all the actual measurement values.

The explanation herein adopts a neural—networks (NN) algorithm as the conjecture algorithm for establishing the conjecture model performing virtual measurement, and uses such as a multi-regression (MR) algorithm to be the reference algorithm for establishing the reference model that serves as a comparison base for the conjecture model. However, the present invention can also apply other algorithms to be the conjecture algorithm or the reference algorithm, provided the reference algorithm differs from the conjecture algorithm, such as a support-vector-regression (SVR) algorithm, a partial-least-squares regression (PLSR) algorithm, a Gaussianprocess-regression (GPR) algorithm or other related algorithms, and thus the present invention is not limited thereto.

When the NN and MR algorithms are utilized, if their convergence conditions both are that SSE (Sum of Square Error) is minimized with n→∞, their standardized predictive measurement values (defined as $$Z_{y_{N_i}} \text{ and } Z_{y_{r_i}}$$

respectively) should be the same as the standardized actual measurement value $Z_{y_i}$. Restated, when n→∞, $$Z_{y_i} = Z_{y_{N_i}} = Z_{y_{r_i}}$$

all represent the standardized actual measurement value, but they have different names due to having different purposes and different estimating models. Hence, $$Z_{y_{N_i}} \sim N(\mu_{Z_{y_i}}, \sigma_{Z_y}^2) \text{ and } Z_{y_{r_i}} \sim N(\mu_{Z_{y_i}}, \sigma_{Z_y}^2)$$

indicate that $Z_{y_{N_i}}$ and $Z_{y_{r_i}}$ share the same statistical distribution. However, owing to the existence of different estimating models, the estimations of mean and standard deviation differ between those two prediction algorithms. Namely the standardized mean-estimating equation ($\hat{\mu}_{Z_{y_i}} = Z_{\hat{y}_{N_i}}$) and standard-deviation-estimating equation $$\left(\hat{\sigma}_{Z_y} = \hat{\sigma}_{Z_{\hat{y}_N}}\right)$$

with respect to the NN conjecture model differ from the standardized mean-estimating equation ($\hat{\mu}_{Z_{y_i}} = Z_{\hat{y}_{r_i}}$) and standard-deviation-estimating equation $$\left(\hat{\sigma}_{Z_y} = \hat{\sigma}_{Z_{\hat{y}_r}}\right)$$

with respect to the MR reference model.

The RI is designed to gauge the reliance level of the virtual metrology value. The RI thus should consider the degree of similarity between the statistical distribution $Z_{\hat{y}_{N_i}}$ of the virtual metrology value and the statistical distribution $Z_{y_i}$ of the actual measurement value. However, when virtual metrology is applied, no actual measurement value can be used to verify the trustworthiness of the virtual metrology value. (Notably, virtual metrology becomes unnecessary if actual measurement values are obtained.) Instead, the present invention adopts the statistical distribution $Z_{\hat{y}_r}$ estimated by the reference algorithm which is such as the MR algorithm to replace $Z_{y_i}$. The reference algorithm also can be such as a support-vector-regression (SVR) algorithm, a partial-least-squares regression (PLSR) algorithm, a Gaussian-process-regression (GPR) algorithm, or other related algorithms, and thus the present invention is not limited thereto.

Figure 4A:
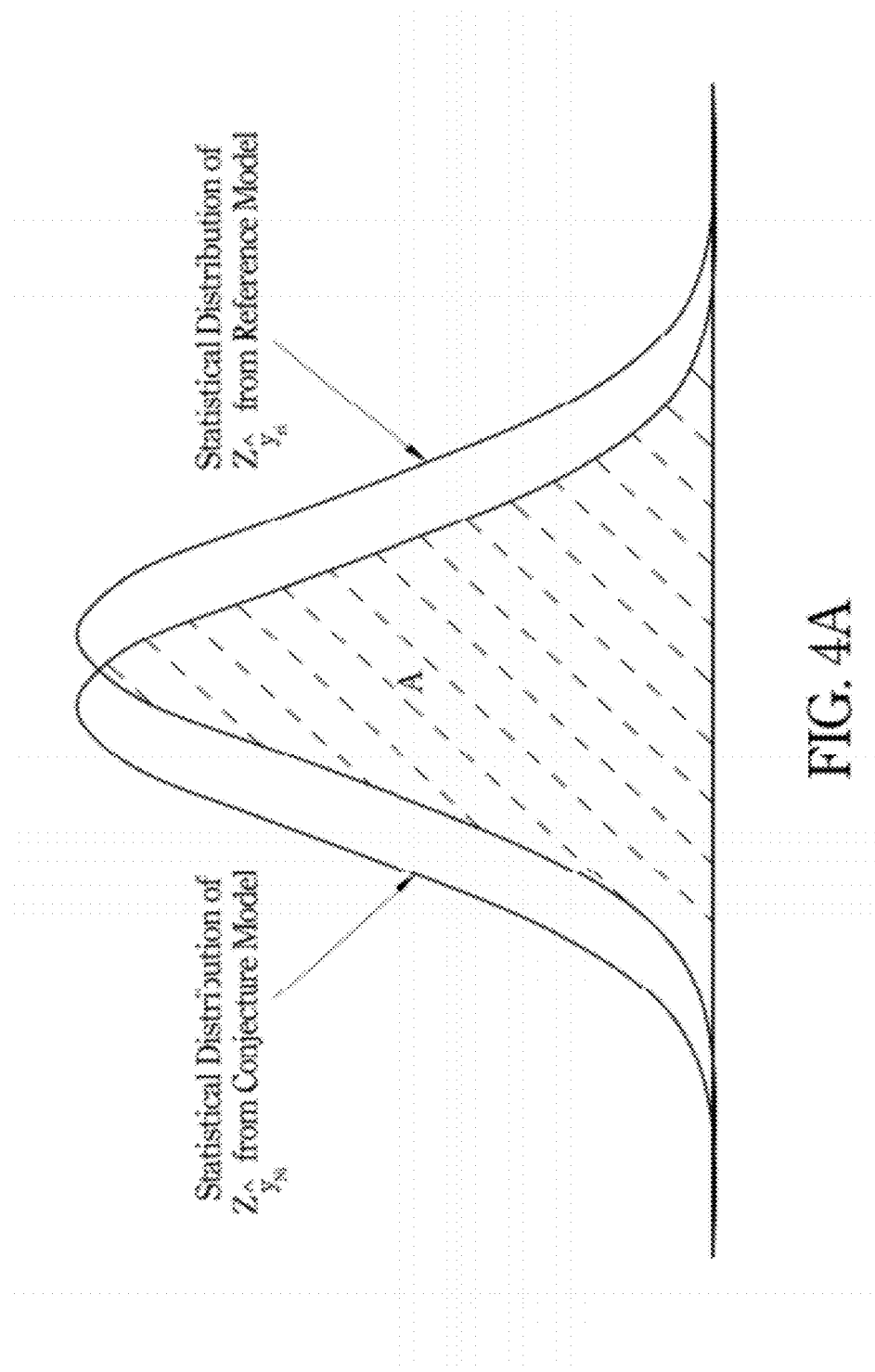
FIG. 4A is a schematic diagram for defining the reliance index (RI) used in an embodiment of the present invention.

Referring to FIG. 4A, FIG. 4A is a schematic diagram for explaining the reliance index (RI) according to the preferred embodiment of the present invention. The RI of the present invention is defined as the intersection-area value (overlap area A) between the statistical distribution $Z_{\hat{y}_{N_i}}$ of the virtual metrology value from the conjecture model (built by such as the NN algorithm) and the statistical distribution $$Z_{\hat{y}_{r_i}}$$

of the reference prediction value from the reference model (built by such as the MR algorithm). As such, the RI equation is listed below:

$$RI = 2 \int_{\frac{Z_{\hat{y}_{N_i}} + Z_{\hat{y}_{r_i}}}{2}}^{\infty} \frac{1}{\sqrt{2\pi}\,\sigma} e^{-\frac{1}{2}\left(\frac{x-\mu}{\sigma}\right)^2} dx \quad (39)$$

with $$\mu = Z_{\hat{y}_{N_i}} \text{ if } Z_{\hat{y}_{N_i}} < Z_{\hat{y}_{r_i}}$$

$$\mu = Z_{\hat{y}_{r_i}} \text{ if } Z_{\hat{y}_{r_i}} < Z_{\hat{y}_{N_i}}$$

and σ is set to be 1.

The RI increases with increasing overlap area A. This phenomenon indicates that the result obtained using the conjecture model is closer to that obtained from the reference model, and thus the corresponding virtual metrology value is more reliable. Otherwise, the reliability of the corresponding measurement value reduces with decreasing RI. When the distribution $Z_{\hat{y}_{N_i}}$ estimated from $Z_{y_{N_i}}$ is fully overlapped with the distribution $Z_{\hat{y}_{r_i}}$ estimated from $Z_{y_{r_i}}$, then according to the distribution theory of statistics, the RI value equals 1; and, when those two distributions are almost separate, the RI value approaches 0.

Hereinafter, the method for calculating the statistical distribution of the virtual metrology values ($Z_{\hat{y}_{N_i}}$ and $\hat{\sigma}_{Z_{\hat{y}N}}$) from the conjecture model is explained.

In the NN conjecture model, if the convergence condition is to minimize SSE, then it can be assumed that "for given $Z_{x_{i,j}}$, $Z_{y_{N_i}}$ is the distribution with mean $\mu_{Z_{y_i}}$ and standard deviation $\sigma_{Z_y}$," namely for given $Z_{x_{i,j}}$, $Z_{y_{N_i}} \sim N(\mu_{Z_{y_i}}, \sigma_{Z_y}^2)$, where the NN estimating equation of $\mu_{Z_{y_i}}$ is $\hat{\mu}_{Z_{y_i}} = Z_{\hat{y}_{N_i}}$, and the NN estimating equation of $\sigma_{Z_y}^2$ is $\hat{\sigma}_{Z_y}^2 = \hat{\sigma}_{Z_{\hat{y}_N}}^2$.

Before the NN conjecture model is constructed, the process data must be standardized. The equations for standardizing the process data are presented below:

$$Z_{x_{i,j}} = \frac{x_{i,j} - \bar{x}_j}{\sigma_{x_j}}, i = 1, 2, \ldots, n, n+1, \ldots, m; \quad (40)$$

$$j = 1, 2, \ldots, p$$

$$\bar{x}_j = \frac{1}{n}(x_{1,j} + x_{2,j} + \ldots + x_{n,j}) \quad (41)$$

$$\sigma_{x_j} = \sqrt{\frac{1}{n-1}[(x_{1,j} - \bar{x}_j)^2 + (x_{2,j} - \bar{x}_j)^2 + \ldots + (x_{n,j} - \bar{x}_j)^2]} \quad (42)$$

wherein $x_{i,j}$ is the j-th process parameter in the i-th set of process data, $Z_{x_{i,j}}$ is the standardized j-th process parameter in the i-th set of process data;

$\bar{x}_j$ is the mean of the j-th process data;

$\sigma_{x_j}$ is the standard deviation of the j-th process data.

The n sets of standardized process data ($Z_{x_{i,j}}$, i=1,2,...,n; j=1,2,...,p) and the n standardized actual measurement values ($Z_{y_i}$, i=1,2,...,n) are utilized to build the NN conjecture model. The m sets of standardized process data ($Z_{x_{i,j}}, i=1, 2,\ldots,m; j=1,2,\ldots,p$) are then inputted into the NN conjecture model to obtain the corresponding standardized virtual metrology values:

$$Z_{\hat{y}_{N_1}}, Z_{\hat{y}_{N_2}}, \ldots, Z_{\hat{y}_{N_n}}, Z_{\hat{y}_{N_{n+1}}}, \ldots, Z_{\hat{y}_{N_m}}.$$

Accordingly, the estimated value of $\mu_{Z_{y_i}}$ (i.e. $\hat{\mu}_{Z_{y_i}} = Z_{\hat{y}_{Ni}}$) and the estimated value of $\sigma_{Z_y}$ (i.e. $\sigma_{Z_y} = \hat{\sigma}_{Z_{\hat{y}N}}$) can be computed as follows:

$$\hat{\mu}_{Z_{y_i}} = Z_{\hat{y}_{N_i}}, i = 1, 2, \ldots, n, n+1, \ldots, m \qquad (43)$$

$$\hat{\sigma}_{Z_{\hat{y}N}} = \sqrt{\frac{1}{n-1}\left[\begin{array}{c}(Z_{\hat{y}_{N_1}} - \overline{Z}_{\hat{y}_N})^2 + (Z_{\hat{y}_{N_2}} - \overline{Z}_{\hat{y}_N})^2 + \ldots + \\ (Z_{\hat{y}_{N_n}} - \overline{Z}_{\hat{y}_N})^2\end{array}\right]} \qquad (44)$$

$$\overline{Z}_{\hat{y}_N} = \frac{1}{n}(Z_{\hat{y}_{N_1}} + Z_{\hat{y}_{N_2}} + \ldots + Z_{\hat{y}_{N_n}}) \qquad (45)$$

wherein $\overline{Z}_{\hat{y}_N}$ is the mean of the standardized virtual metrology values.

Hereinafter, the method for calculating the reference predication values ($Z_{\hat{y}_{ri}}$ and $\hat{\sigma}_{Z_{\hat{y}r}}$) from the MR model is explained.

The basic assumption of the MR is that "for given $Z_{y_{i,j}}$, $Z_{y_{ri}}$ is the distribution with mean $\mu_{Z_{y_i}}$ and standard deviation $\sigma_{Z_y}$", namely for given $Z_{x_{i,j}}$, $Z_{y_{ri}} \sim N(\mu_{Z_{y_i}}, \sigma_{Z_y}^2)$, wherein the MR estimating equation of $$\mu_{Z_{y_i}}$$

is $\hat{\mu}_{Z_{y_k}} = Z_{\hat{y}_{ri}}$, and the MR estimating equation of $\sigma_{Z_y}^2$ is $\hat{\sigma}_{Z_y}^2 = \hat{\sigma}_{Z_{\hat{y}r}}^2$.

To obtain the MR relationship between the n sets of standardized process data ($Z_{x_{i,j}}, i=1,2,\ldots,n; j=1,2,\ldots,p$) and the n standardized actual measurement values, ($Z_{y_i}, i=1,2,\ldots,n$), the weighting factors $\beta_r = [\beta_{r0}, \beta_{r1}, \beta_{r2}, \ldots, \beta_{rp}]^T$ corresponding to those p parameters must be defined by using the MR analysis. The relationship between $Z_{y_i}$ and $Z_{x_{i,j}}$ thus is constructed as follows:

$$\beta_{r0} + \beta_{r1}Z_{x_{1,1}} + \beta_{r2}Z_{x_{1,2}} + \ldots + \beta_{rp}Z_{x_{1,p}} = Z_{y_1} \qquad (46)$$
$$\beta_{r0} + \beta_{r1}Z_{x_{2,1}} + \beta_{r2}Z_{x_{2,2}} + \ldots + \beta_{rp}Z_{x_{2,p}} = Z_{y_2}$$
$$\ldots$$
$$\beta_{r0} + \beta_{r1}Z_{x_{n,1}} + \beta_{r2}Z_{x_{n,2}} + \ldots + \beta_{rp}Z_{x_{n,p}} = Z_{y_n}$$

Let $$Z_y = \begin{pmatrix} Z_{y_1} \\ Z_{y_2} \\ \vdots \\ Z_{y_n} \end{pmatrix} \qquad (47)$$

and $$Z_x = \begin{pmatrix} 1 & Z_{x_{1,1}} & \ldots & Z_{x_{1,p}} \\ 1 & Z_{x_{2,1}} & \ldots & Z_{x_{2,p}} \\ \vdots & \vdots & \ddots & \vdots \\ 1 & Z_{x_{n,1}} & \ldots & Z_{x_{n,p}} \end{pmatrix} \qquad (48)$$

The least square method can obtain the estimating equation of $\beta_r$, $\hat{\beta}_r = [\hat{\beta}_{r0}, \hat{\beta}_{r1}, \hat{\beta}_{r2}, \ldots, \hat{\beta}_{rp}]^T$ as $$\hat{\beta}_r = (Z_x^T Z_x)^{-1} Z_x^T Z_y \qquad (49)$$

Therefore, the MR reference model can be obtained as $$Z_{\hat{y}_{ri}} = \hat{\beta}_{r0} + \hat{\beta}_{r1}Z_{x_{i,1}} + \hat{\beta}_{r2}Z_{x_{i,2}} + \ldots + \hat{\beta}_{rp}Z_{x_{i,p}}$$
$$i=1,2,\ldots,n,n+1,\ldots,m \qquad (50)$$

Hence, during the conjecture phase, after inputting a set of process data, its MR estimating value $Z_{\hat{y}_{ri}}$ corresponding thereto can be obtained via equation (50). The MR estimating equation of the standard deviation $\sigma_{Z_y}$ is $\hat{\sigma}_{Z_{\hat{y}r}}$ with $$\hat{\sigma}_{Z_{\hat{y}r}} = \sqrt{\frac{1}{n-1}\left[\begin{array}{c}(Z_{\hat{y}_{r_1}} - \overline{Z}_{\hat{y}_r})^2 + (Z_{\hat{y}_{r_2}} - \overline{Z}_{\hat{y}_r})^2 + \ldots + \\ (Z_{\hat{y}_{r_n}} - \overline{Z}_{\hat{y}_r})^2\end{array}\right]} \qquad (51)$$

$$\overline{Z}_{\hat{y}_r} = \frac{1}{n}(Z_{\hat{y}_{r_1}} + Z_{\hat{y}_{r_2}} + \ldots + Z_{\hat{y}_{r_n}}) \qquad (52)$$

After obtaining the NN estimating equations ($Z_{\hat{y}_N}$ and $\hat{\sigma}_{Z_{\hat{y}N}}$) and the MR estimating equations ($Z_{\hat{y}_r}$ and $\hat{\sigma}_{Z_{\hat{y}r}}$), their normal distribution curves can be depicted, as illustrated in FIG. 4A. Thus, the RI of each virtual metrology value can be derived by calculating the intersection area value (overlap area A).

After obtaining the RI, the RI threshold value ($RI_T$) must be defined. If $RI > RI_T$, then the reliance level of the virtual metrology value is acceptable. A systematic approach for determining the $RI_T$ is described below.

Before determining the $RI_T$, it is necessary to define a maximal tolerable error limit ($E_L$). The error of the virtual metrology value is an absolute percentage of the difference between the actual measurement value $y_i$ and $\hat{y}_{Ni}$ obtained from the NN conjecture model divided by the mean of all the actual measurement values, $\overline{y}$, namely $$Error_i = \left|\frac{y_i - \hat{y}_{Ni}}{\overline{y}}\right| \times 100\% \qquad (53)$$

Figure 4B:
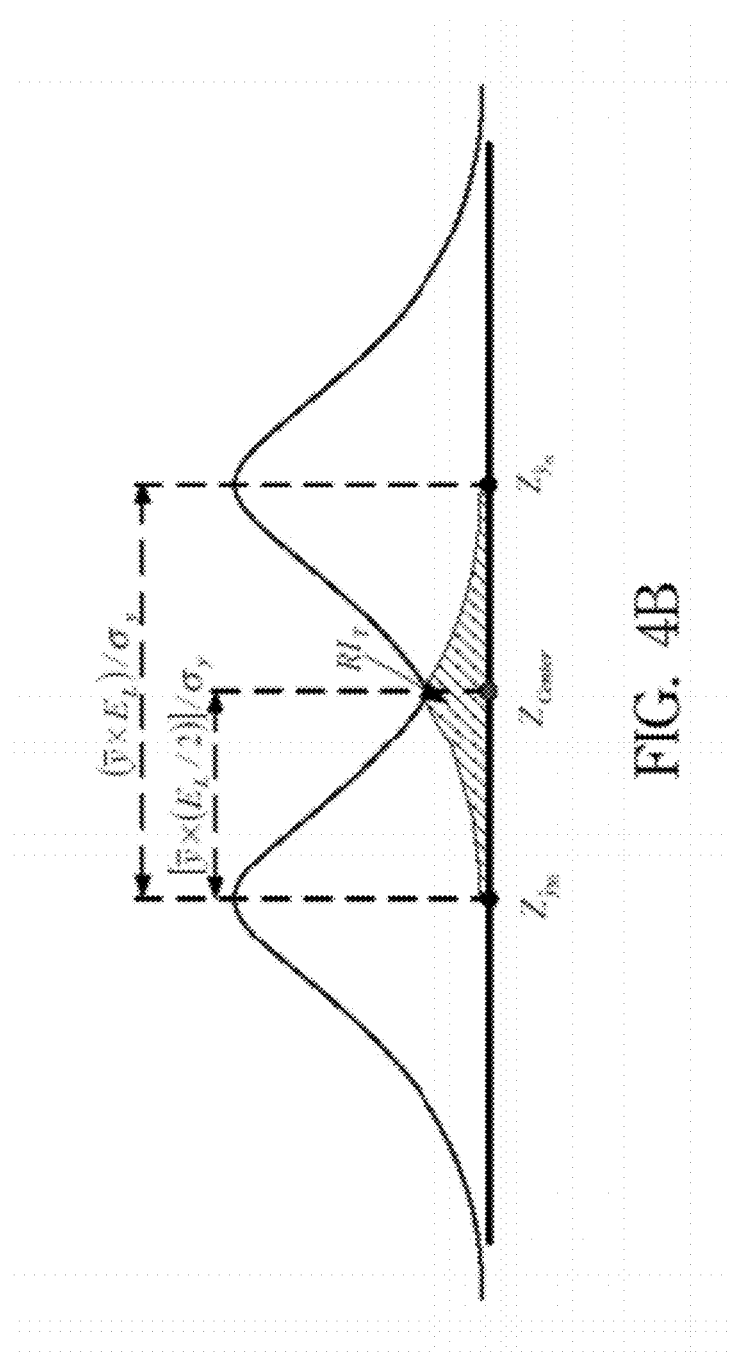
FIG. 4B is a schematic diagram for defining the RI threshold ($RI_T$) according to the embodiment of the present invention.

The $E_L$ can then be specified based on the error defined in equation (53) and the accuracy specification of virtual metrology (VM). Consequently, $RI_T$ is defined as the RI value corresponding to the $E_L$, as shown in FIG. 4B. That is $$RI_T = 2\int_{Z_{Center}}^{\infty} \frac{1}{\sqrt{2\pi}\,\sigma} e^{-\frac{1}{2}\left(\frac{x-\mu}{\sigma}\right)^2} dx \qquad (54)$$

with $\mu$ and $\sigma$ defined in equation (39) and $$Z_{Center} = Z_{\hat{y}_{Ni}} + [\overline{y} \times (E_L/2)]/\sigma_y \qquad (55)$$

where $\sigma_y$ is specified in equation (38).

The following presents the algorithms related to the GSI and explains their operating procedures.

Global Similarity Indexes (GSI)

When virtual metrology is applied, no actual measurement value is available to verify the accuracy of the virtual metrology value. Therefore, instead of the standardized actual measurement value $Z_{y_i}$ the standardized MR prediction value $Z_{\hat{y}_{ri}}$ is adopted to calculate the RI. This substitution may cause inevitable gauging errors in the RI. To compensate for this unavoidable substitution, a global similarity index (GSI) is provided to help the RI gauge the reliance level of virtual metrology and identifying the key process parameters with large deviations (z score values).

The GSI assesses the degree of similarity between any set of process data and the model set of process data. This model set is derived from all of the sets of historical process data used for building the conjecture model.

The present invention may utilize a statistical distance measure, such as Mahalanobis distance, to quantify the degree of similarity. Mahalanobis distance is a distance measure introduced by P.C. Mahalanobis in 1936. This measure is based on correlation between variables to identify and analyze different patterns of sample sets. Mahalanobis distance is a useful way of determining similarity of an unknown sample set to a known one. This method considers the correlation of the data set and is scale-invariant, namely it is not dependent on the scale of measurements. If the data set has high similarity, the calculated Mahalanobis distance calculated will be relatively small.

The present invention uses the calculated GSI (applying Mahalanobis distance) size to determine whether the newly input set of process data is similar to the model set of process data. If the calculated GSI is small, the newly input set is relatively similar to the model set. Thus the virtual metrology value of the newly input (high-similarity) set is relatively accurate. On the contrary, if the calculated GSI is too large, the newly input set is somewhat different from the model set. Consequently, the virtual metrology value estimated in accordance with the newly input (low-similarity) set has low reliance level in terms of accuracy.

The equations to calculate the standardized process data $Z_{x_{ij}}$ of the conjecture model are shown in equations (40), (41) and (42). At first, the model set of the process parameters is defined as $X_M=[x_{M,1}, x_{M,2}, \ldots, x_{M,p}]^T$, where $x_{M,j}$ equals $\bar{x}_j, j=1,2,\ldots,p$, so that each element in the model set after standardization (also denoted as the standardized model parameter, $Z_{M,j}$) has a value of 0. Restated, all of the elements in $Z_M=[Z_{M,1}, Z_{M,2}, \ldots, Z_{M,p}]^T$ are 0. Thereafter, the correlation coefficients between the standardized model parameters are calculated.

Assuming that the correlation coefficient between the s-th parameter and the t-th parameter is $r_{st}$ and that there are k sets of data, then $$r_{st} = \frac{1}{k-1}\sum_{l=1}^{k} z_{sl} \cdot z_{tl} = \frac{1}{k-1}(z_{s1} \cdot z_{t1} + z_{s2} \cdot z_{t2} + \ldots + z_{sk} \cdot z_{tk}) \quad (56)$$

After calculating the correlation coefficients between the standardized model parameters, the matrix of correlation coefficients can be obtained as $$R = \begin{bmatrix} 1 & r_{12} & \ldots & r_{1p} \\ r_{21} & 1 & \ldots & r_{2p} \\ \vdots & \vdots & \ddots & \vdots \\ r_{p1} & r_{p2} & \ldots & 1 \end{bmatrix} \quad (57)$$

Assuming that the inverse matrix ($R^{-1}$) of R is defined as A, then $$A = R^{-1} = \begin{bmatrix} a_{11} & a_{12} & \ldots & a_{1p} \\ a_{21} & a_{22} & \ldots & a_{2p} \\ \ldots & \ldots & \ldots & \ldots \\ a_{p1} & a_{p2} & \ldots & a_{pp} \end{bmatrix} \quad (58)$$

Hence, the equation for calculating the Mahalanobis distance ($D_\lambda^2$) between the standardized λ-th set process data ($Z_\lambda$) and the standardized model set process data ($Z_M$) is as follows.

$$D_\lambda^2 = (Z_\lambda - Z_M)^T R^{-1}(Z_\lambda - Z_M) \quad (59)$$
$$= Z_\lambda^T R^{-1} Z_\lambda$$

Finally, we have $$D_\lambda^2 = \sum_{j=1}^{p}\sum_{i=1}^{p} a_{ij} z_{i\lambda} z_{j\lambda} \quad (60)$$

The GSI of the standardized λ-th set process data is, then, equal to $D_\lambda^2/p$.

After obtaining the GSI, the GSI threshold ($GSI_T$) should be defined. Generally, the default $GSI_T$ is assigned to be two to three times the maximal GSI, (the subscript "a" stands for each historical set during the training phase).

Figure 5:
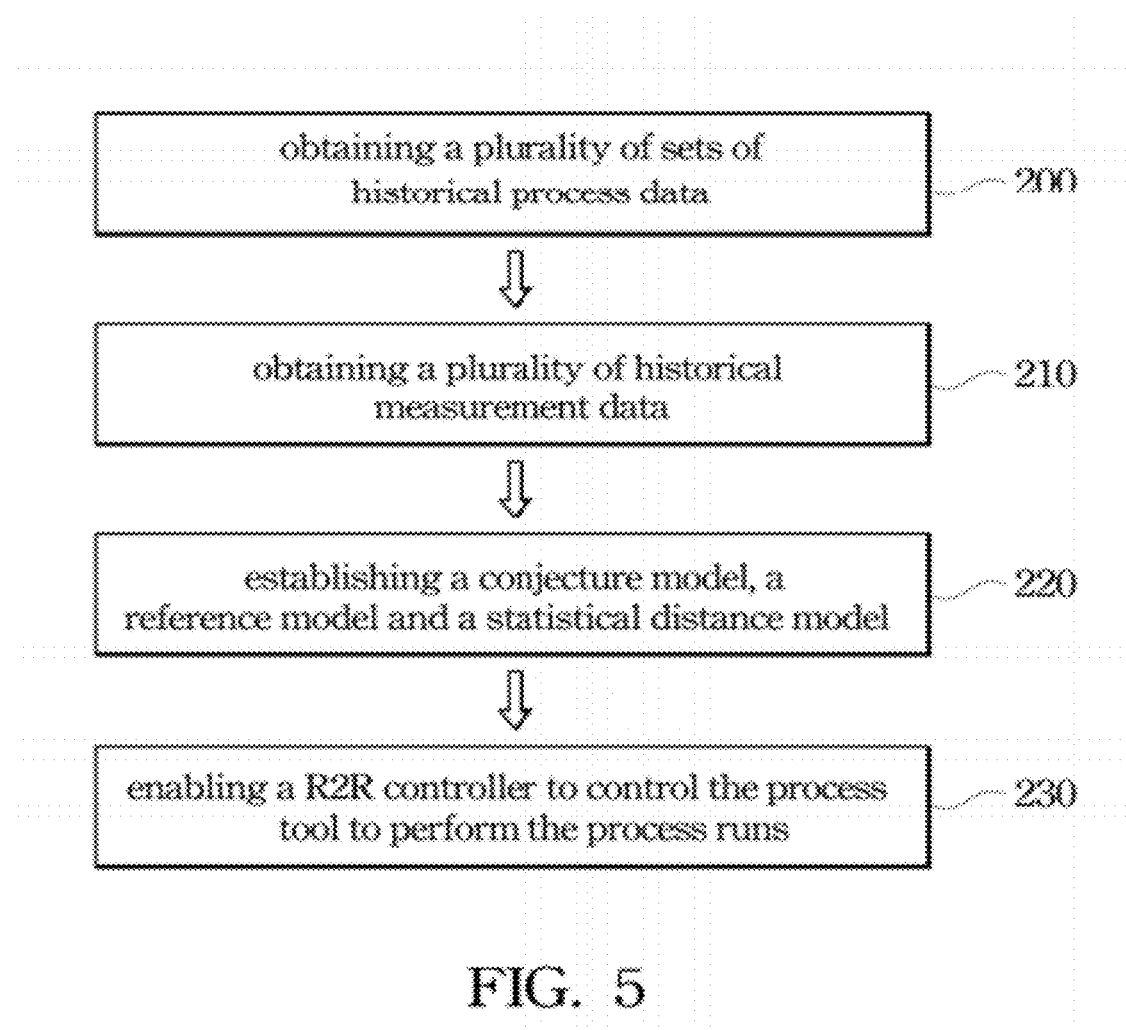
FIG. 5 is a schematic flow chart showing a W2W APC method according to an embodiment of the present invention.

Referring to FIG. 5, FIG. 5 is a schematic flow chart showing an APC method according to an embodiment of the present invention. In the APC method, step 200 is performed for obtaining a plurality of sets of historical process data used by a process tool for processing a plurality of historical workpieces. Step 210 is performed for obtaining a plurality of historical measurement data of the historical workpieces measured by a metrology tool, wherein the historical measurement values are the measurement values of the historical workpieces which are manufactured in accordance with the sets of historical process data stated in Step 200, respectively. Step 220 is performed for establishing a conjecture model in accordance with a conjecture algorithm by using the sets of historical process data and the historical measurement values; establishing a reference model in accordance with a reference algorithm by using the sets of historical process data and their corresponding historical measurement values and establishing a statistical distance model in accordance with a statistical distance algorithm by using the sets of historical process data. Step 230 is performed for enabling a run-to-run (R2R) controller to control the process tool to perform the process runs in accordance with the aforementioned equations (13)-(15).

The aforementioned embodiments can be provided as a computer program product, which may include a machine-readable medium on which instructions are stored for programming a computer (or other electronic devices) to perform a process based on the embodiments of the present invention. The machine-readable medium can be, but is not limited to, a floppy diskette, an optical disk, a compact disk-read-only memory (CD-ROM), a magneto-optical disk, a read-only memory (ROM), a random access memory (RAM), an erasable programmable read-only memory (EPROM), an electrically erasable programmable read-only memory (EEPROM), a magnetic or optical card, a flash memory, or another type of media/machine-readable medium suitable for storing electronic instructions. Moreover, the embodiments of the present invention also can be downloaded as a computer program product, which may be transferred from a remote computer to a requesting computer by using data signals via a communication link (such as a network connection or the like).

Hereinafter, illustrative examples are provided and compared for explaining that the embodiment of the present invention is useful and advantageous.

The W2W control of a CMP tool with a periodic maintenance (PM) cycle being 600 pieces (pcs) of wafers is selected as the illustrative example for evaluation and comparisons. The simulation conditions and scenarios are listed as follows:

1. $y_k$ is the actual removal amount measured from the metrology tool and $PostY_k$ is the actual post CMP thickness of run k. The specification of $PostY_k$ is 2800±150 Angstrom (Å) with 2800 being the target value denoted by $Tgt_{PostY}$. Therefore, we have $$PostY_k = PreY_k - y_k \qquad (61)$$

with $$Y_k = ARR_k * u_k \qquad (62)$$

where $ARR_k$ is the actual removal rate of run k and $u_k$ represents the polish time in this example.

The well-known Preston equation, empirically found from the experiment of the glass polishing in 1927, has been proposed to predict the material removal rate of CMP. According to the Preston equation, the material removal rate is affected by the contact pressure (also denoted as tool stress) distribution at contact point, magnitude of the relative velocity (also denoted as tool rotation speed) at contact point between wafer and polishing pad, and constant representing the effect of the other remaining parameters including the slurry fluid speed, pad property, and so on. Therefore, $ARR_k$ is simulated by:

$$ARR_k = \left( A_k \times \left(\frac{Stress1 + Stress2}{1000}\right) \times \left(\frac{Rotspd1 + Rotspd2}{100}\right) \times \left(\frac{Sfuspd1 + Sfuspd2}{100}\right) \right) + (PM1 + PM2) + Error \qquad (63)$$

The meanings of Stress1, Stress2, Rotspd1, Rotspd2, Sfuspd1, Sfuspd2, PM1, PM2, and Error are tabulated in Table 2. The $A_k$ in equation (63) is the nominal removal rate, which is empirically simulated by a polynomial curve fitting of parts usage count between PMs (denoted by PU varying from 1 to 600):

$$A_k = (4 \times 10^{-6}) \times (PU-1)^3 - (3.4 \times 10^{-3}) \times (PU-1)^2 + (6.9 \times 10^{-3}) \times (PU-1) + (1.202 \times 10^3) \qquad (64)$$

2. $Post\hat{Y}_k$ represents the predictive value of $PostY_k$, and then, from equations (61) and (62) we have $$\hat{y}_k = A\hat{R}R_k * u_k \qquad (65)$$

$$Post\hat{Y}_k = PreY_k - \hat{y}_k = PreY_k - A\hat{R}R_k * u_k \qquad (66)$$

where $$A\hat{R}R_k = f(Stress, Roupd, Sfuspd, PU, PU^2, PU^3) \qquad (67)$$

$A\hat{R}R_k$ is the VM value of $ARR_k$ with Stress (=Stress1+Stress2), Rotspd (=Rotspd1+Rotspd2), Sfuspd (=Sfuspd1+Sfuspd2), PU, $PU^2$, $PU^3$ as the process parameters. The reason of adopting Stress, Rotspd, Sfuspd, PU, $PU^2$, and $PU^3$ as the process parameters is based on the Preston equation, equations (63) and (64). The setting values of the simulated process parameters are tabulated in Table 2.

TABLE 2

Simulation-Parameter Definitions and Setting Values

| Abbreviation | Definition | Setting Values Mean | VAR |
|---|---|---|---|
| Error | Random error represented by white noise | 0 | 300 |
| PM1 | Error due to tool-parts' variation that was caused by periodic maintenance (PM) | 0 | 100 |
| PM2 | Random disturbance of tool-parts' variation | 0 | 6 |
| Stress1 | Tool stress error due to re-assembly during PM | 1000 | 2000 |
| Stress2 | Random disturbance of tool stress | 0 | 20 |
| Rotspd1 | Tool rotation-speed error due to re-assembly during PM | 100 | 25 |
| Rotspd2 | Random disturbance of tool rotation speed | 0 | 1.2 |
| Sfuspd1 | Slurry fluid-speed error due to re-assembly during PM | 100 | 25 |
| Sfuspd2 | Random disturbance of slurry fluid speed | 0 | 1.2 |
| $PreY_k$ | Pre-process (etching depth) value that affects the process result of run k | 3800 | 2500 |

3. The k+1 run control action is derived by $$Tgt_{k+1} = PreY_{k+1} - Tgt_{PostY} \qquad (68)$$

$$u_{k+1} = \frac{Tgt_{k+1} - \tilde{\eta}_{k+1}}{A_{k+1}} \qquad (69)$$

4. When $PostY_k$ is measured by an actual metrology tool, then $$\tilde{\eta}_{k+1} = \alpha_1(y_z - A_k u_k) + (1-\alpha_1)\tilde{\eta}_k \qquad (70)$$

When $PostY_k$ is conjectured or predicted by a VM system, then $$\tilde{\eta}_{k+1} = \alpha_{2,k}(\hat{y}_k - A_k u_k) + (1-\alpha_{2,k})\tilde{\eta}_k \qquad (71)$$

with $$\alpha_{2,k} = f(RI_k, GSI_k) \times \alpha_1 \qquad (72)$$

where

-continued $$f(RI_k, GSI_k) = \begin{cases} 0, \text{ if } RI_k < RI_T \text{ or } GSI_k > GSI_T \\ RI_k, \text{ if } RI_k \geq RI_T \text{ and} \\ \quad GSI_k \leq GSI_T \text{ and for } k \leq C \\ 1 - RI_k, \text{ if } RI_k \geq RI_T \text{ and} \\ \quad GSI_k \leq GSI_T \text{ and for } k > C \end{cases} \quad (73)$$

For this example, C=25.

5. 1 Lot=25 workpieces in which the $2^{nd}$ workpiece being the sampling wafer.

6.

$$Cpk(\text{Process Capability}) = \min\left\{\frac{UCL - \text{mean}(PostY)}{3 \times \text{std}(PostY)}, \frac{\text{mean}(PostY) - LCL}{3 \times \text{std}(PostY)}\right\} \quad (74)$$

with $UCL = 2950$ and $LCL = 2650$.

$$7.\ MAPE_{Process} = \frac{\sum_{i=1}^{k} |(PostY_i - Tgt_{PostY})Tgt_{PostY}|}{k} \times 100\% \quad (75)$$

8. Extra random disturbances caused by Sfuspd2 with mean=0 and variance=0.36 are also added at Samples 50, 111, 179, 251, 349, and 503. In other words, the combined variances of Sfuspd2 at Samples 50, 111, 179, 251, 349, and 503 are 1.2+0.36=1.56. With these extra random disturbances, the to RI and/or GSI values may exceed their thresholds.

Five rounds with different random seeds are performed to evaluate and compare the performance. For each round, the simulation results of $PreY_k$, $Tgt_k$, $A_k$, and $ARR_k$ for k=1~600 should be generated firstly based on the setting values shown in Table 2, equations (68), (64) and (63), respectively. Then, let $\alpha_1$=0.35 and $\tilde{\eta}_1$=0 to calculate $u_1$ as well as apply equations (62), (70), (69) and (61) to calculate $y_k$, $\eta_{k+1}$, $u_{k+1}$ and $PostY_k$, respectively for k=1 and 2 for all of the five cases. As for k=3~600, control schemes for those five cases are different and are described below:

Case 1: R2R with in-situ metrology

Let $\alpha_1$=0.35. Apply equations (62), (70), (69) and (61) to calculate $y_k$, $\tilde{\eta}_{k+1}$, $u_{k+1}$, and $PostY_k$, respectively for k=3~600.

Case 2: R2R+VM without RI

Let $\alpha_2$=$\alpha_1$=0.35. Apply equations (65), (71), (69), (66) and (61) to calculate $\hat{y}_k$, $\tilde{\eta}_{k+1}$, $u_{k+1}$, $Post\hat{Y}_k$, and $PostY_k$, respectively for k=3~600.

Case 3: R2R+VM with RI

Let $\alpha_1$=0.35. If $RI<RI_T$ or $GSI>GSI_T$, then let $\alpha_2$=0; otherwise, let $\alpha_{2,k}$=$RI_k \times \alpha_1$; as well as apply equations (65), (71), (69), (66) and (61) to calculate $\hat{y}_k$, $\tilde{\eta}_{k+1}$, $u_{k+1}$, $Post\hat{Y}_k$, and $PostY_k$, respectively for k=3~600.

Case 4: R2R+VM with (1-RI)

Let $\alpha_1$=0.35. If $RI<RI_T$ or $GSI>GSI_T$, then let $\alpha_2$=0; otherwise, let $\alpha_{2,k}$=(1-$RI_k$)$\times \alpha_1$; as well as apply equations (65), (71), (69), (66) and (61) to calculate $\hat{y}_k$, $\tilde{\eta}_{k+1}$, $u_{k+1}$, $Post\hat{Y}_k$, and $PostY_k$, respectively for k=3~600.

Case 5: R2R+VM with RII(1-RI)

Let $\alpha_1$=0.35. Apply the RII(1-RI) switching scheme as shown in equations (72) and (73) to set $\alpha_2$; as well as apply equations (65), (71), (69), (66), and (61) to calculate $\hat{y}_k$, $\tilde{\eta}_{k+1}$, $u_{k+1}$, $Post\hat{Y}_k$, and $PostY_k$, respectively for k=3~600.

Both Cpk (Process Capability Index) and $MAPE_{Process}$ (Mean Absolute Percentage Error; as expressed in equations (74) and (75), respectively) are applied to evaluate and compare the performance of those 5 cases. The Cpk and $MAPE_{Process}$ values of those 5 cases are tabulated in Tables 3 and 4, respectively.

Observing Tables 3 and 4 and treating Case 1 as the baseline, it is obvious that the performance of Case 2, which does not consider RI/GSI, is the worst. Case 3, which filters out the bad-quality $Post\hat{Y}_k$ (VM) values and lets $\alpha_2$=RI$\times \alpha_1$, is the most natural approach and has acceptable performance. The performance of Case 4, which filters out the bad-quality $Post\hat{Y}_k$ (VM) values and lets $\alpha_2$=(1-RI)$\times \alpha_1$, is better than that of Case 3 on average except for Round 1. Case 5, which filters out the bad-quality $Post\hat{Y}_k$ (VM) values and applies the RII(1-RI) switching scheme shown in equation (73), fixes the problem of Case 4 in Round 1; and Case 5's performance is compatible with that of Case 1 (in-situ metrology).

TABLE 3

Cpk Values of 5-Cases APC Methods

| | Case 1: Insitu | | | Case 2: VM | | | Case 3: VM + RI | | | Case 4: VM + (1 − RI) | | | Case 5: VM + RI/(1 − RI) | | |
|---|---|---|---|---|---|---|---|---|---|---|---|---|---|---|---|
| Round | 1~25 | 1~200 | 1~600 | 1~25 | 1~200 | 1~600 | 1~25 | 1~200 | 1~600 | 1~25 | 1~200 | 1~600 | 1~25 | 1~200 | 1~600 |
| 1 | 1.09 | 1.58 | 1.62 | 1.14 | 1.42 | 1.31 | 1.14 | 1.54 | 1.49 | 1.12 | 1.29 | 1.38 | 1.14 | 1.57 | 1.55 |
| 2 | 1.73 | 1.89 | 1.86 | 1.51 | 1.64 | 1.72 | 1.51 | 1.73 | 1.77 | 1.89 | 2.00 | 2.04 | 1.51 | 1.71 | 1.74 |
| 3 | 1.60 | 1.74 | 1.77 | 1.72 | 1.64 | 1.77 | 1.72 | 1.72 | 1.80 | 1.76 | 1.79 | 1.87 | 1.72 | 1.85 | 1.90 |
| 4 | 1.43 | 1.95 | 1.87 | 1.45 | 1.74 | 1.72 | 1.45 | 1.89 | 1.76 | 1.51 | 1.95 | 1.87 | 1.45 | 1.94 | 1.87 |
| 5 | 1.32 | 1.85 | 1.81 | 1.41 | 1.78 | 1.71 | 1.41 | 1.83 | 1.79 | 1.33 | 1.77 | 1.81 | 1.41 | 1.89 | 1.86 |
| mean | 1.43 | 1.80 | 1.80 | 1.45 | 1.64 | 1.65 | 1.45 | 1.74 | 1.72 | 1.52 | 1.76 | 1.80 | 1.45 | 1.79 | 1.78 |

TABLE 4

MAPEProcess Values of 5-Cases APC Methods

| | Case 1: Insitu | | | Case 2: VM | | | Case 3: VM + RI | | |
|---|---|---|---|---|---|---|---|---|---|
| Round | 1~25 | 1~200 | 1~600 | 1~25 | 1~200 | 1~600 | 1~25 | 1~200 | 1~600 |
| 1 | 1.13% | 0.86% | 0.86% | 1.35% | 1.00% | 1.07% | 1.35% | 0.94% | 1.00% |
| 2 | 0.85% | 0.75% | 0.76% | 0.98% | 0.87% | 0.81% | 0.97% | 0.84% | 0.79% |
| 3 | 0.84% | 0.85% | 0.82% | 0.94% | 0.86% | 0.81% | 0.94% | 0.83% | 0.79% |
| 4 | 0.93% | 0.73% | 0.76% | 1.11% | 0.83% | 0.83% | 1.11% | 0.78% | 0.82% |

TABLE 4-continued

MAPEProcess Values of 5-Cases APC Methods

| 5 | 0.99% | 0.75% | 0.78% | 1.05% | 0.78% | 0.82% | 1.05% | 0.77% | 0.80% |
|---|---|---|---|---|---|---|---|---|---|
| mean | 0.95% | 0.79% | 0.80% | 1.08% | 0.87% | 0.87% | 1.09% | 0.83% | 0.84% |

| | | Case 4: VM + (1 − RI) | | | Case 5: VM + RI/(1 − RI) | | |
|---|---|---|---|---|---|---|---|
| Round | 1~25 | 1~200 | 1~600 | 1~25 | 1~200 | 1~600 |
| 1 | 2.52% | 1.45% | 1.15% | 1.35% | 0.98% | 0.97% |
| 2 | 0.80% | 0.72% | 0.69% | 0.97% | 1.05% | 0.82% |
| 3 | 1.03% | 0.80% | 0.76% | 0.94% | 0.77% | 0.75% |
| 4 | 1.07% | 0.84% | 0.79% | 1.11% | 0.84% | 0.79% |
| 5 | 1.41% | 0.83% | 0.78% | 1.05% | 0.77% | 0.76% |
| mean | 1.37% | 0.93% | 0.83% | 1.09% | 0.88% | 0.82% |

Simulation Results of Round 1 for those 5 cases are shown in FIG. 6A to is FIG. 6E, wherein the first 400 workpieces are shown in the figures. Due to the fact that extra random disturbances caused by Sfuspd2 with mean=0 and variance=0.36 are added at Samples 50, 111, 179, 251, 349, and 503, bad Post$\hat{Y}_k$ (VM) values are generated and displayed in FIG. 6B. Those bad VM values as shown in FIG. 6B can be detected by RI and/or GSI.

The $RI_T$ and $GSI_T$ are set at 0.7 and 9, respectively in this example. The cases that RI<$RI_T$ and GSI>$GSI_T$ at Sample 50 of Round 1 as well as GSI>$GSI_T$ at Sample 349 of Round 1 are enlarged and depicted in FIG. 7 and FIG. 8, respectively.

Figure 7:
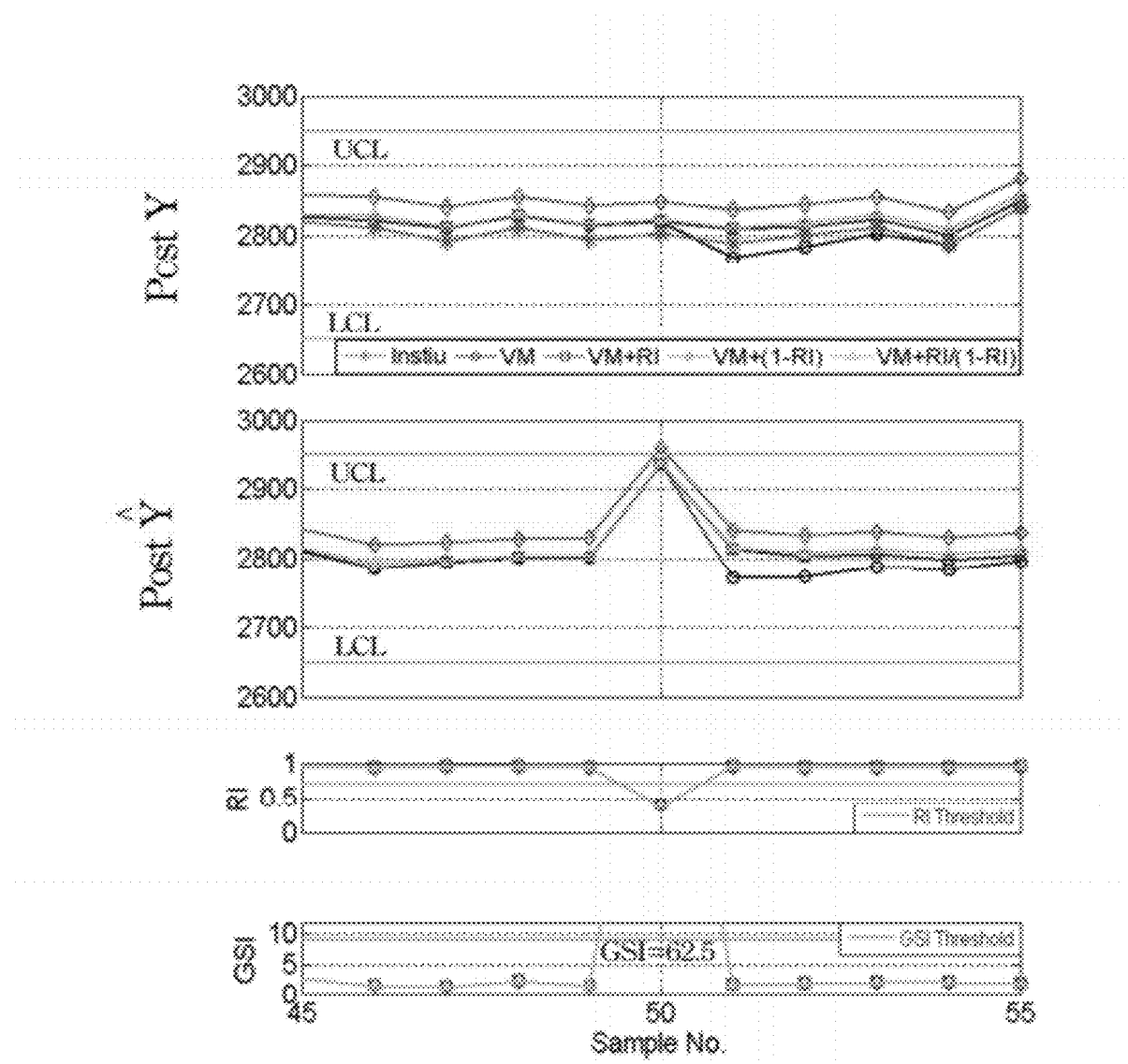
FIG. 7 shows the simulation results of five cases for the $45^{th}$-$55^{th}$ workpieces.

As shown in FIG. 7, the Sample 50's Post$\hat{Y}_{50}$ (VM) values of various cases are deviated with extra variance 0.36 adding to Sfuspd2. Owing to the fact that RI<$RI_T$ and GSI>$GSI_T$, those Post$\hat{Y}_{50}$ values of Cases 3, 4, and 5 are filtered out by setting $\alpha_2$=0, while the Post$\hat{Y}_{50}$ value of Case 2 is still adopted to adjust the R2R controller gain with $\alpha_2$=$\alpha_1$=0.35. The effect of filtering out the to bad-quality Post$\hat{Y}_{50}$ value is displayed in Sample 51, which shows that the Post$Y_{51}$ value of Case 2 is pulled down by the R2R controller since the Post$\hat{Y}_{50}$ value at Sample 50 is too high. As for the other cases, Post$Y_{50}$ and Post$Y_{51}$ have no much difference.

Figure 8:
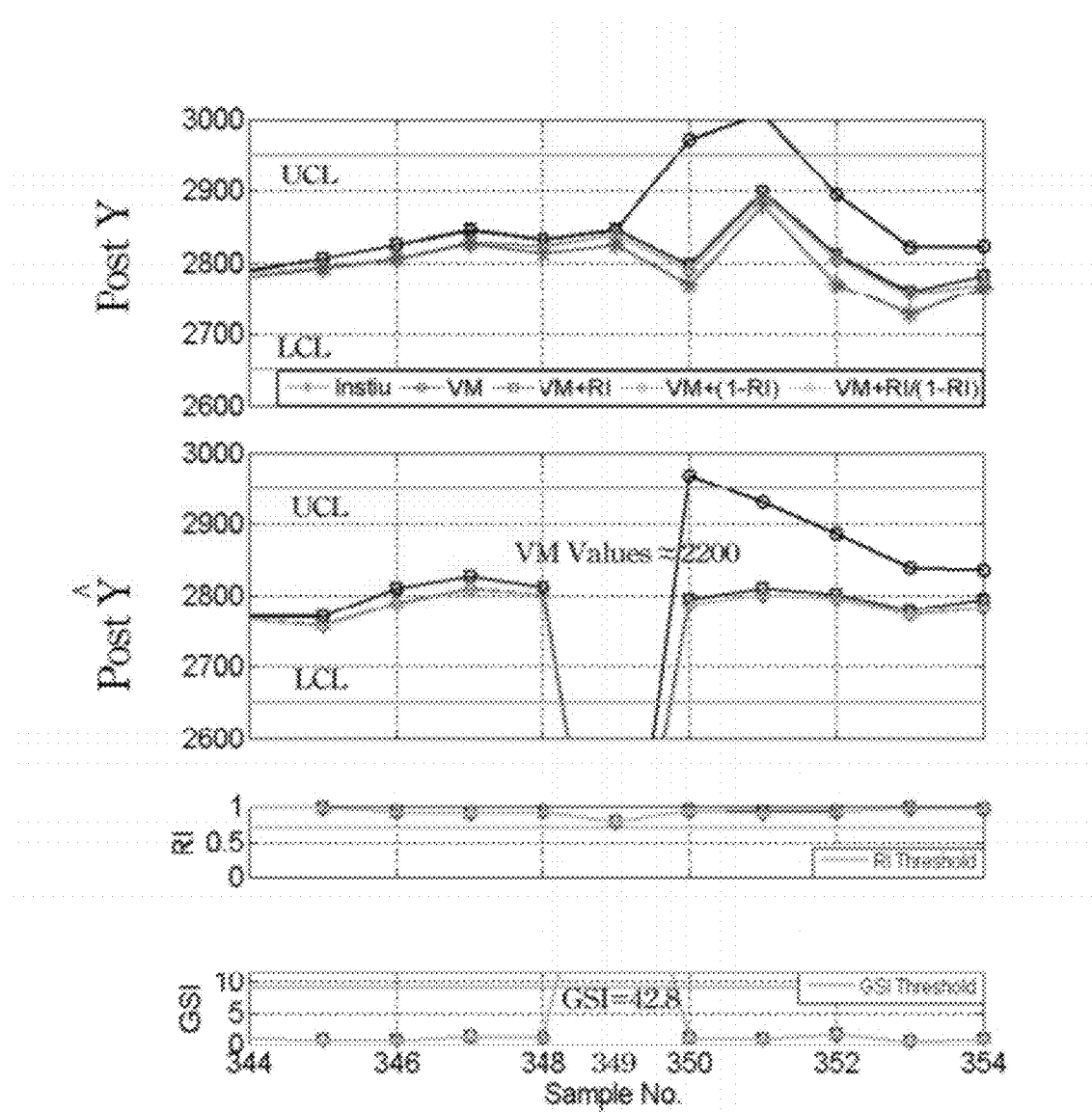
FIG. 8 shows the simulation results of five cases for the $344^{th}$-$354^{th}$ workpieces.

Observing FIG. 8, the Sample 349's Post$\hat{Y}_{349}$ values of various cases are deviated with extra variance 0.36 adding to Sfuspd2, again. In this case, only GSI exceeds its threshold. By the same token, these bad Post$Y_{349}$ values are discarded in Cases 3, 4, and 5 yet not in Case 2. As such, improper R2R control result of Case 2, which generates a surge Post$Y_{350}$, is shown in FIG. 8. The evidences displayed in FIG. 7 and FIG. 8 reveal that the result of adopting an unreliable VM value is worse than if no VM at all is utilized.

As mentioned above, $\alpha_2$=RI×$\alpha_1$ when Post$Y_k$ is apart from the target value or production process is relatively unstable. On the contrary, if Post$Y_k$ is near the target or production process is relatively stable, then $\alpha_2$=(1−RI)×$\alpha_1$.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An advanced process control (APC) system, comprising:
a process tool for processing a plurality of historical workpieces in accordance with a plurality of sets of historical process data, and performing a plurality of process runs on a plurality of workpieces in accordance with a plurality of sets of process data;
a metrology tool for measuring said historical workpieces and a plurality of sampling workpieces selected from said workpieces, thereby providing a plurality of historical measurement data of said historical workpieces and a plurality of actual measurement values of said sampling workpieces which have been processed in said process runs;
a virtual metrology (VM) module for providing a plurality of virtual metrology values of said process runs by inputting said sets of process data into a conjecture model, wherein said conjecture model is built in accordance with a conjecture algorithm by using said sets of historical process data and said historical measurement values corresponding thereto, wherein said historical measurement values are the measurement values of said historical workpieces which are manufactured in accordance with said sets of historical process data, respectively;
a reliance index (RI) module for generating respective reliance indexes (RI) of said process runs, wherein each of said reliance indexes (RI) corresponding to the process run is generated by calculating the overlap area between the statistical distribution of the virtual metrology value of the workpiece and the statistical distribution of a reference prediction value of the workpiece, wherein said reference prediction value of the process run is generated by inputting the set of process data of the workpiece into a reference model, wherein said reference model is built in accordance with a reference algorithm by using said sets of historical process data and said historical measurement values corresponding thereto, and said conjecture algorithm is different from said reference algorithm, and the reliance index is higher when the overlap area is larger, representing that the reliance level of the virtual metrology value corresponding to the reliance index is higher;
a run-to-run (R2R) controller for controlling said process tool to perform said process runs in accordance with the following relationships:

$$u_{z+1} = g(G_{1,1}, G_{1,2}, \ldots G_{1,i}, y_z);$$

$$u_{k+1} = g(G_{2,1}, G_{2,2}, \ldots G_{2,i}, \hat{y}_k);$$

$$G_{2,i} = f(RI_k) \times G_{1,i};$$

where $G_{2,i}$=0 or $\hat{y}_{k-1}$ but not $\hat{y}_k$ is adopted for tuning said R2R controller, if $R_k < RI_T$;

$$f(RI_k) = RI_k, \text{ if } RI_k \geq RI_T \text{ and } k \leq C;$$

$$f(RI_k) = 1 - RI_k, \text{ if } RI_k \geq RI_T \text{ and } k > C;$$

wherein $y_z$ represents the actual measurement value of the sampling workpiece which has been processed in the $z^{th}$ process run;

$u_{hd z+1}$ represents the control action of the $(z+1)^{th}$ process run when $y_z$ is adopted;

$G_{1,i}$ represents the controller gain used in said R2R controller when $y_z$ is adopted, wherein i represents the number of the controller gains used in said R2R controller;

$\hat{y}_k$ represents the virtual metrology value of the workpiece which has been processed in the $k^{th}$ process run;

$u_{k+1}$ represents the control action of the $(k+1)^{th}$ process run when $\hat{y}_k$ is adopted;

$G_{2,i}$ represents the controller gain used in said R2R controller when $\hat{y}_k$ is adopted;

$RI_k$ represents the reliance index (RI) of the kth process run;

$RI_T$ represents the RI threshold value based on the maximal tolerable error limit defined by the errors of the virtual metrology values obtained from said conjecture model; and C stands for a predetermined number of process runs.

2. The APC system as claimed in claim 1, wherein said conjecture algorithm and said reference algorithm are respectively selected from the group consisting of a multi-regression (MR) algorithm, a support-vector-regression (SVR) algorithm, a neural-networks (NN) algorithm, a partial-least-squares regression (PLSR) algorithm, and a Gaussian-process-regression (GPR) algorithm.

3. The APC system as claimed in claim 1, further comprising:
a global similarity index (GSI) module for generating respective global similarity indexes (GSI) of said process runs by inputting said sets of process data into a statistical distance model, wherein said statistical distance model is built in accordance with a statistical distance algorithm by using said sets of historical process data, wherein $G_{2,i}=0$ or $\hat{y}_{k-1}$ but not $\hat{y}_k$ is adopted for tuning said R2R controller, if $GSI_k > GSI_T$, where $GSI_k$ represents the global similarity index (GSI) of the kth process run; $GSI_T$ represents the GSI threshold value defined by two to three times of the maximal global similarity indexes of said sets of historical process data.

4. The APC system as claimed in claim 3, wherein said statistical distance algorithm is a Mahalanobis distance algorithm or an Euclidean distance algorithm.

5. The APC system as claimed in claim 1, wherein said R2R controller is a moving-average (MA) controller, an exponentially-weighted-moving-average (EWMA) controller, a double-EWMA controller, or a proportional-integral-derivative (PID) controller.

6. A computer-implemented APC method, comprising:
obtaining, by a VM module, a plurality of sets of historical process data used by a process tool for processing a plurality of historical workpieces;
obtaining, by a VM module, a plurality of historical measurement data of the historical workpieces measured by a metrology tool, wherein said historical measurement values are the measurement values of said historical workpieces which are manufactured in accordance with said sets of historical process data, respectively;
establishing, by a VM module, a conjecture model in accordance with a conjecture algorithm by using said sets of historical process data and said historical measurement values corresponding thereto, and establishing, by a RI module, a reference model in accordance with a reference algorithm by using said sets of historical process data and said historical measurement values corresponding thereto, wherein said conjecture algorithm is different from said reference algorithm; and
controlling, by a run-to-run (R2R) controller, said process tool to perform process runs in accordance with the following relationships;

$$u_{z+1}=g(G_{1,1}, G_{1,2}, \ldots, G_{1,i}, y_z);$$

$$u_{k+1}=g(G_{2,1}, G_{2,2}, \ldots, G_{2,i}, \hat{y}_k);$$

$$G_{2,i}=f(RI_k) \times G_{1,i};$$

where $G_{2,i}=0$ or $\hat{y}_{k-1}$ but not $\hat{y}_k$ is adopted for tuning said R2R controller, if $RI_k < RI_T$;

$f(RI_k)=RI_k$, if $RI_k \geq RI_T$ and $k \leq C$;

$f(RI_k)=1-RI_k$, if $RI_k \geq RI_T$ and $k > C$;

wherein $y_z$ represents an actual measurement value of a sampling workpiece which has been processed in the $z^{th}$ process run by said process tool and measured by said metrology tool;

$u_{z+1}$ represents the control action of the $(z+1)^h$ process run when $y_z$ is adopted;

$G_{1,i}$ represents the controller gain used in said R2R controller when $y_z$ is adopted, wherein i represents the number of the controller gains used in said R2R controller;

$\hat{y}_k$ generated by the VM module represents a virtual metrology value of a workpiece which has been processed in the $k^{th}$ process run by said process tool, and is generated by inputting a set of process data of said workpiece into said conjecture model;

$u_{k+1}$ represents the control action of the $(k+1)^{th}$ process run when $\hat{y}_k$ is adopted;

$G_{2,i}$ represents the controller gain used in said R2R controller when $\hat{y}_k$ is adopted;

$RI_k$ generated by the RI module represents a reliance index (RI) of the kth process run, wherein said reliance index corresponding to the kth process run is generated by calculating an overlap area between the statistical distribution of said virtual metrology value of said workpiece and the statistical distribution of a reference prediction value of said workpiece, wherein said reference prediction value of the kth process run is generated by inputting said set of process data of said workpiece into said reference model, wherein said reliance index is higher when said overlap area is larger, representing that said reliance level of said virtual metrology value corresponding to said reliance index is higher;

$RI_T$ represents the RI threshold value based on the maximal tolerable error limit defined by the errors of the virtual metrology values obtained from said conjecture model; and C stands for a predetermined number of process runs.

7. The comnuter-implemented APC method as claimed in claim 6, wherein said conjecture algorithm and said reference algorithm are respectively selected from the group consisting of a multi-regression (MR) algorithm, a support-vector-regression (SVR) algorithm, a neural-networks (NN) algorithm, a partial-least-squares regression (PLSR) algorithm, and a Gaussian-process-regression (GPR) algorithm.

8. The APC method as claimed in claim 6, further comprising:
establishing, by a GSI module, a statistical distance model in accordance with a statistical distance algorithm by using said sets of historical process data; and
controlling, by said run-to-run (R2R) controller, said process tool to perform process runs in accordance with the following relationship:

$G_{2,i}=0$ or $\hat{y}_{k-1}$ but not $\hat{y}_k$ is adopted for tuning said R2R controller, if $GSI_k > GSI_T$, where $GSI_k$ generated by the GSI module represents a global similarity index (GSI) of the kth process run and is generated by inputting said set of process data of said workpiece into said statistical distance model; $GSI_T$ represents the GSI threshold value defined by two to three times of the maximal global similarity indexes of said sets of historical process data.

9. The computer-implemented APC method as claimed in claim 8, wherein said statistical distance algorithm is a Mahalanobis distance algorithm or an Euclidean distance algorithm.

10. The computer-implemented APC method as claimed in claim 6, wherein said R2R controller is a moving-average (MA) controller, an exponentially-weighted-moving-average (EWMA) controller, a double-EWMA controller (d-EWMA), or a proportional-integral-derivative (PID) controller.

11. A computer program product stored on a non transitory tangible computer readable recording medium, which, when executed, performs an APC method comprising:
    obtaining a plurality of sets of historical process data used by a process tool for processing a plurality of historical workpieces;
    obtaining a plurality of historical measurement data of the historical workpieces measured by a metrology tool, wherein said historical measurement values are the measurement values of said historical workpieces which are manufactured in accordance with said sets of historical process data, respectively;
    establishing a conjecture model in accordance with a conjecture algorithm by using said sets of historical process data and said historical measurement values corresponding thereto, and a reference model in accordance with a reference algorithm by using said sets of historical process data and said historical measurement values corresponding thereto, wherein said conjecture algorithm is different from said reference algorithm; and
    enabling a run-to-run (R2R) controller to control said process tool to perform said process runs in accordance with the following relationships:

$$u_{z+1}=g(G_{1,1},G_{1,2},\ldots,G_{1,i},y_z)$$

$$u_{k+1}=g(G_{2,1},G_{2,2},\ldots,G_{2,i},\hat{y}_k)$$

$$G_{2,i}=f(RI_k)\times G_{1,i}$$

where $G_{2,i}=0$ or $\hat{y}_{k-1}$ but not $\hat{y}_k$ is adopted for tuning said R2R controller, if $RI_k < RI_T$;

$$f(RI_k)=RI_k, \text{ if } RI_k \geq RI_T \text{ and } k \leq C;$$

$$f(RI_k)=1-RI_k, \text{ if } RI_k \geq RI_T \text{ and } k > C;$$

wherein $y_z$ represents an actual measurement value of a sampling workpiece which has been processed in the $z^{th}$ process run by said process tool and measured by said metrology tool;
$u_{z+1}$ represents the control action of the $(z+1)^{th}$ process run when $y_z$ is adopted;
$G_{1,i}$ represents the controller gain used in said R2R controller when $y_z$ is adopted, wherein i represents the number of the controller gains used in said R2R controller;
$\hat{y}_k$ represents a virtual metrology value of a workpiece which has been processed in the $k^{th}$ process run by said process tool, and is generated by inputting a set of process data of said workpiece into said conjecture model;
$u_{k+1}$ represents the control action of the $(k+1)^{th}$ process run when $\hat{y}_k$ is adopted;
$G_{2,i}$ represents the controller gain used in said R2R controller when $\hat{y}_k$ is adopted;
$RI_k$ represents a reliance index (RI) of the kth process run, wherein said reliance index corresponding to the kth process run is generated by calculating an overlap area between the statistical distribution of said virtual metrolou value of said workpiece and the statistical distribution of a reference prediction value of said workpiece, wherein said reference prediction value of the kth process run is generated by inputting said set of process data of said workpiece into said reference model, wherein said reliance index is higher when said overlap area is larger, representing that said reliance level of said virtual metrology value corresponding to said reliance index is higher;
$RI_T$ represents a RI threshold value based on a maximal tolerable error limit defined by the errors of the virtual metrology values obtained from said conjecture model; and
C stands for a predetermined number of process runs.

12. The computer program product as claimed in claim 11, wherein said conjecture algorithm and said reference algorithm are respectively selected from the group consisting of a multi-regression (MR) algorithm, a support-vector-regression (SVR) algorithm, a neural-networks (NN) algorithm, a partial-least-squares regression (PLSR) algorithm, and a Gaussian-process-regression (GPR) algorithm.

13. The computer program product as claimed in claim 11, said APC method further comprising:
    establishing a statistical distance model is built in accordance with a statistical distance algorithm by using said sets of historical process data; and
    enabling said run-to-run (R2R) controller to control said process tool to perform process runs in accordance with the following relationship:
    $G_{2,i}=0$ or $\hat{y}_{k-1}$ but not $\hat{y}_k$ is adopted for tuning said R2R controller, if $GSI_k > GSI_T$, where $GSI_k$ represents a global similarity index (GSI) of the kth process run and is generated by inputting said set of process data of said workpiece into said statistical distance model; $GSI_T$ represents a GSI threshold value defined by two to three times of the maximal global similarity indexes of said sets of historical process data.

14. The computer program product as claimed in claim 13, wherein said statistical distance algorithm is a Mahalanobis distance algorithm or an Euclidean distance algorithm.

15. The computer program product as claimed in claim 11, wherein said R2R controller is a moving-average (MA) controller, an exponentially-weighted-moving-average (EWMA) controller, a double-EWMA controller, or a proportional-integral-derivative (PID) controller.

* * * * *